Oct. 20, 1936.  DE MAR A. PALMER  2,057,735
CONTROLLING MECHANISM FOR VEHICLE DUMP DOORS
Original Filed Nov. 10, 1930   7 Sheets-Sheet 1
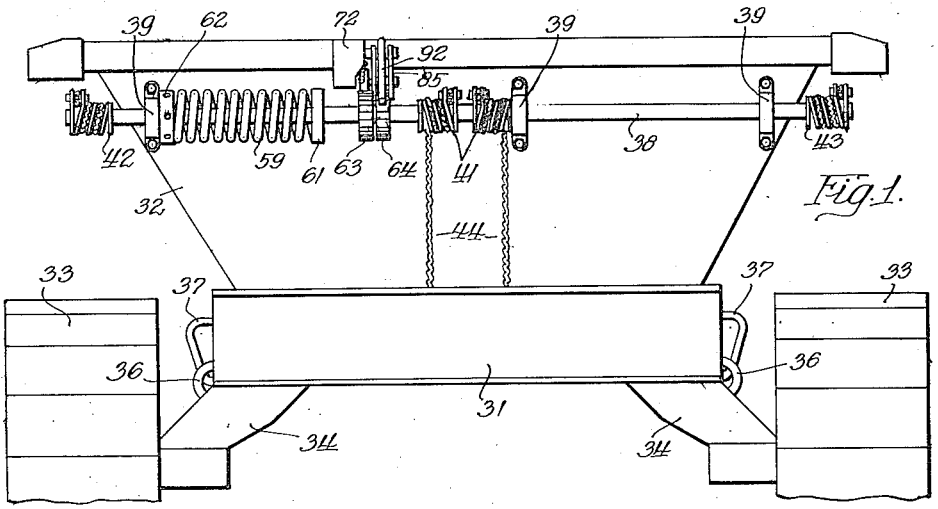
Inventor:
De Mar A. Palmer
By Brown, Jackson, Butcher & Dienner
Attys.

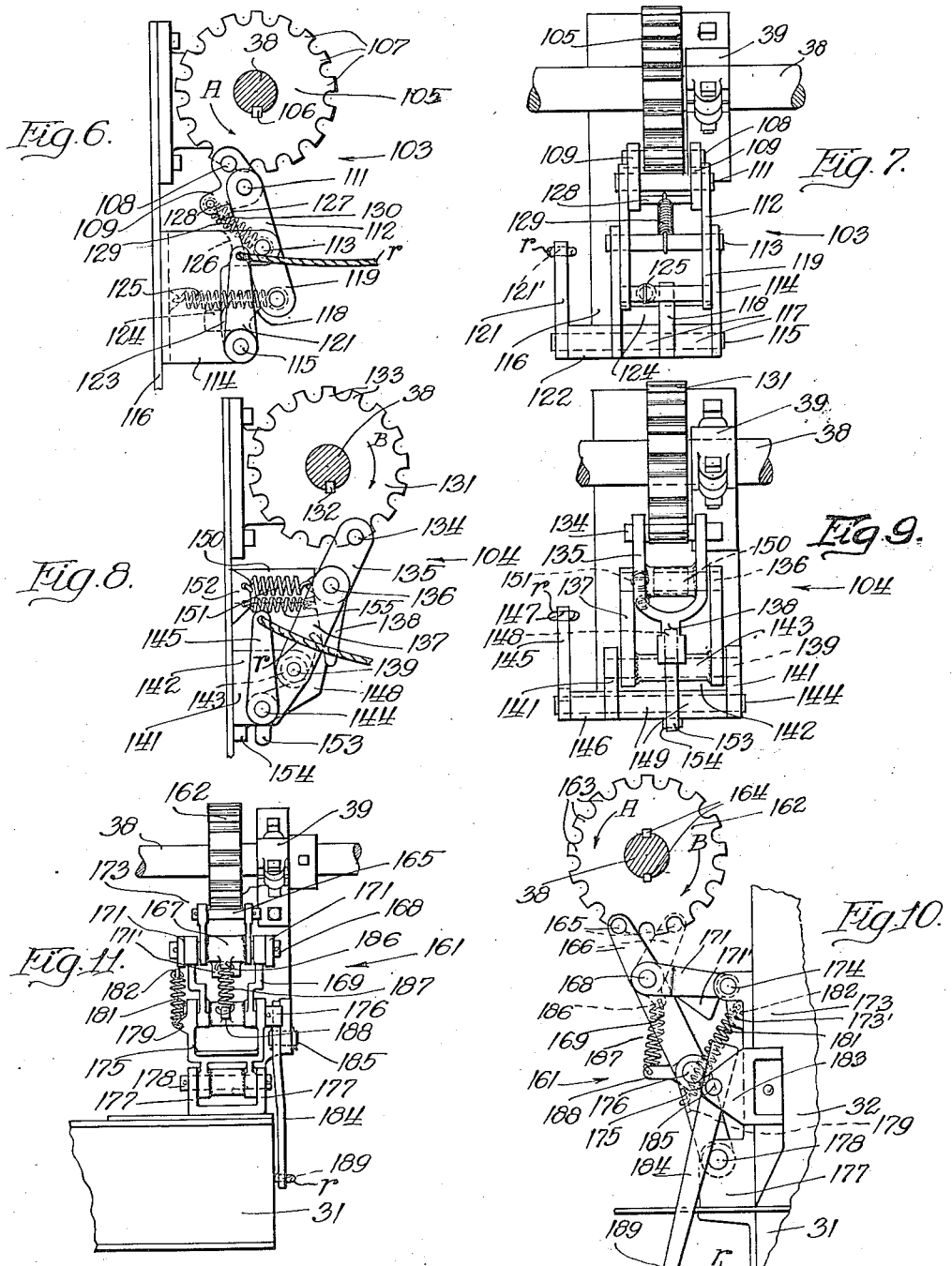

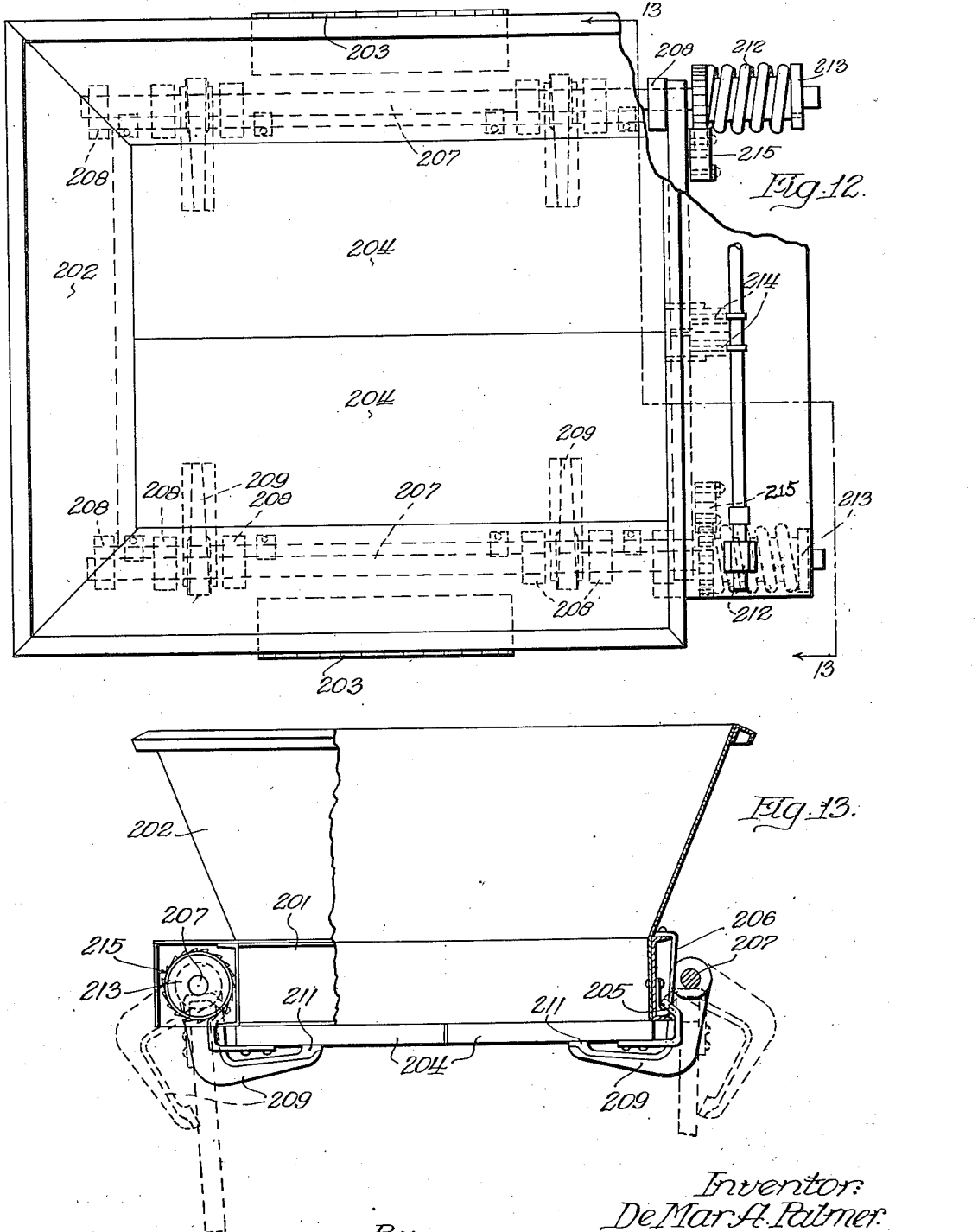

Oct. 20, 1936. DE MAR A. PALMER 2,057,735
CONTROLLING MECHANISM FOR VEHICLE DUMP DOORS
Original Filed Nov. 10, 1930 7 Sheets-Sheet 4
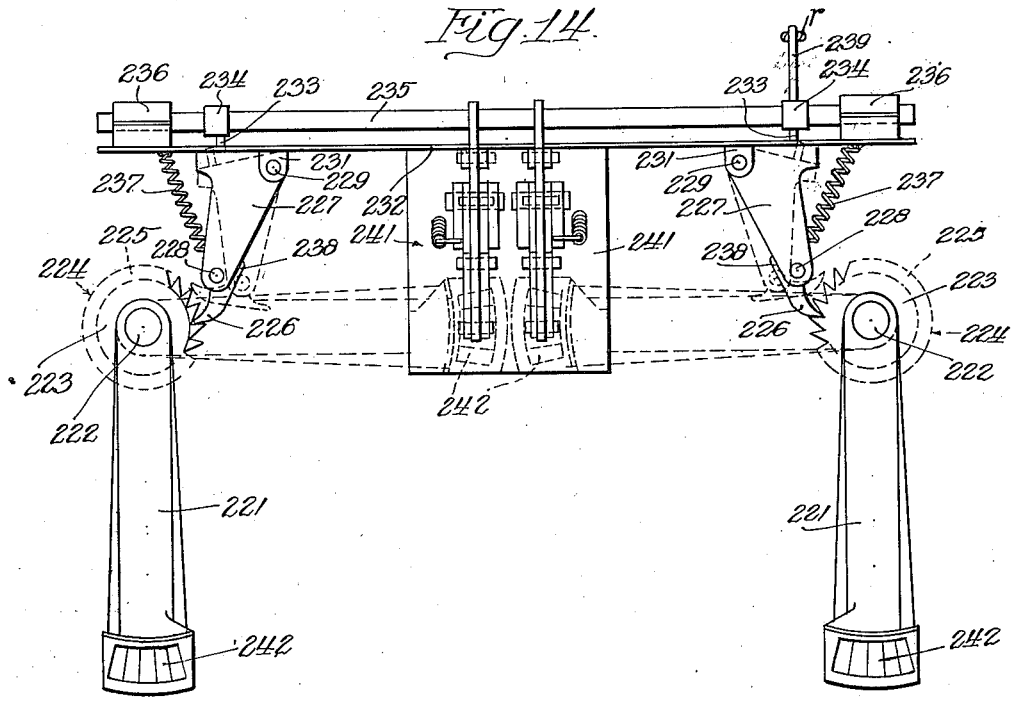
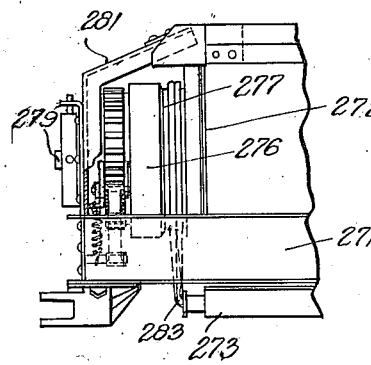
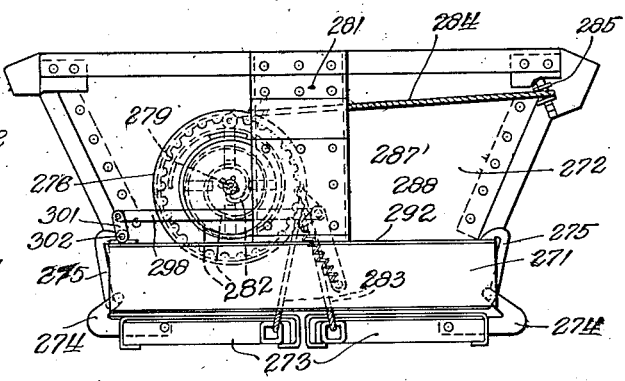
Inventor:
De Mar A. Palmer.
By Brown, Jackson, Boettcher & Dienner
Attys.

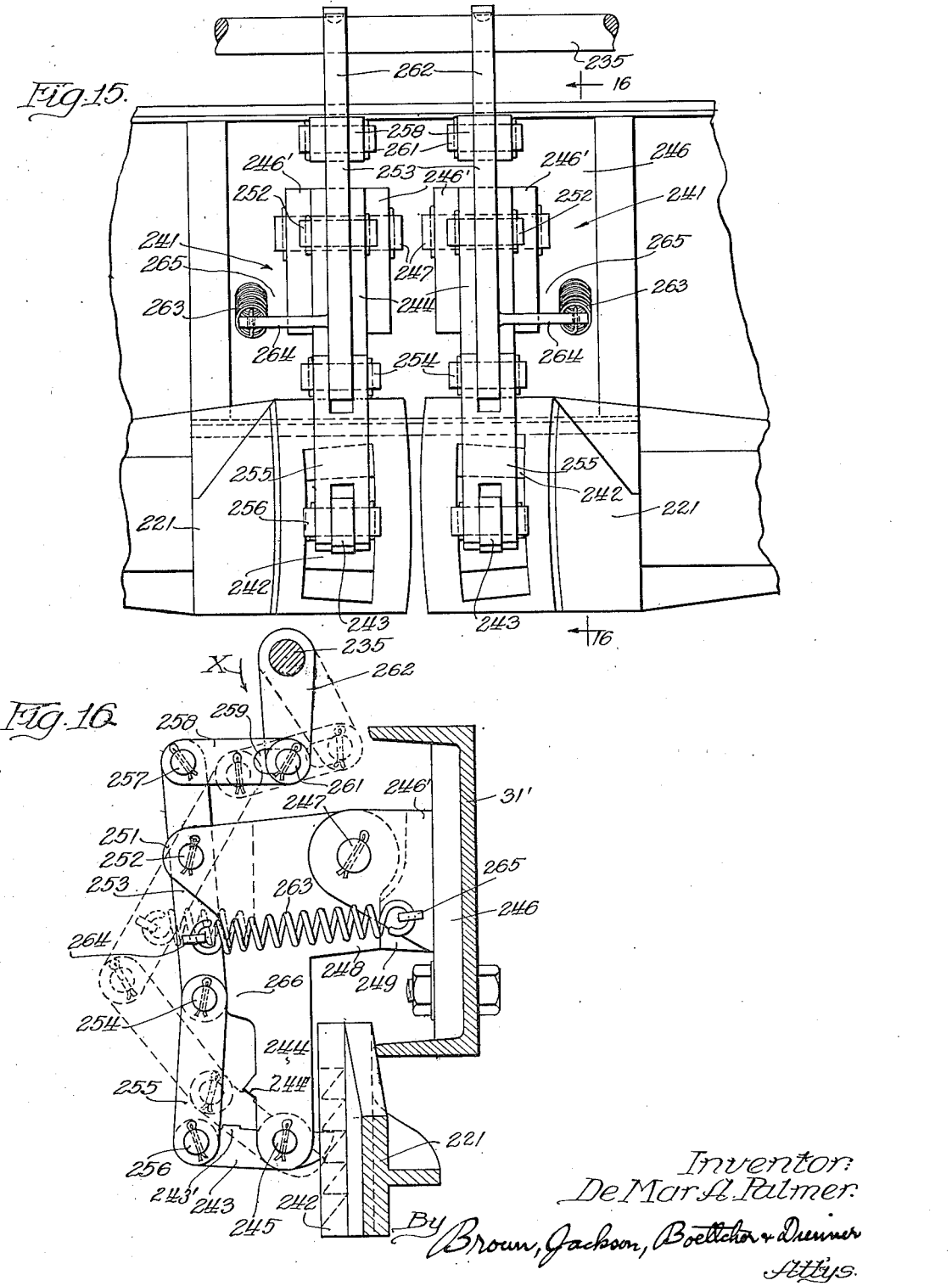

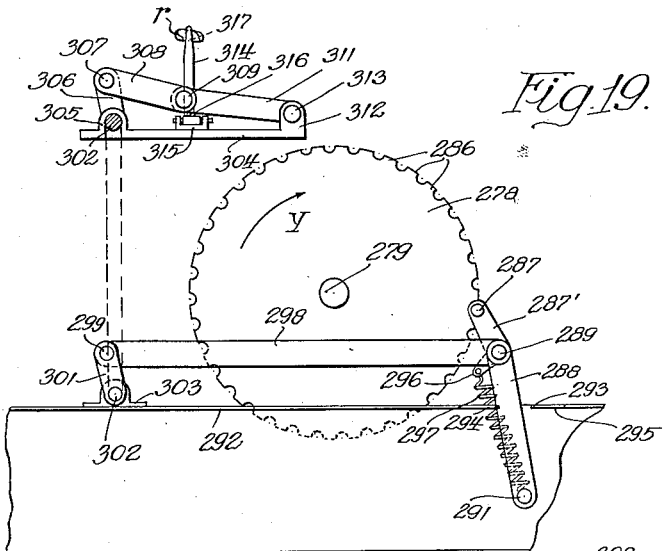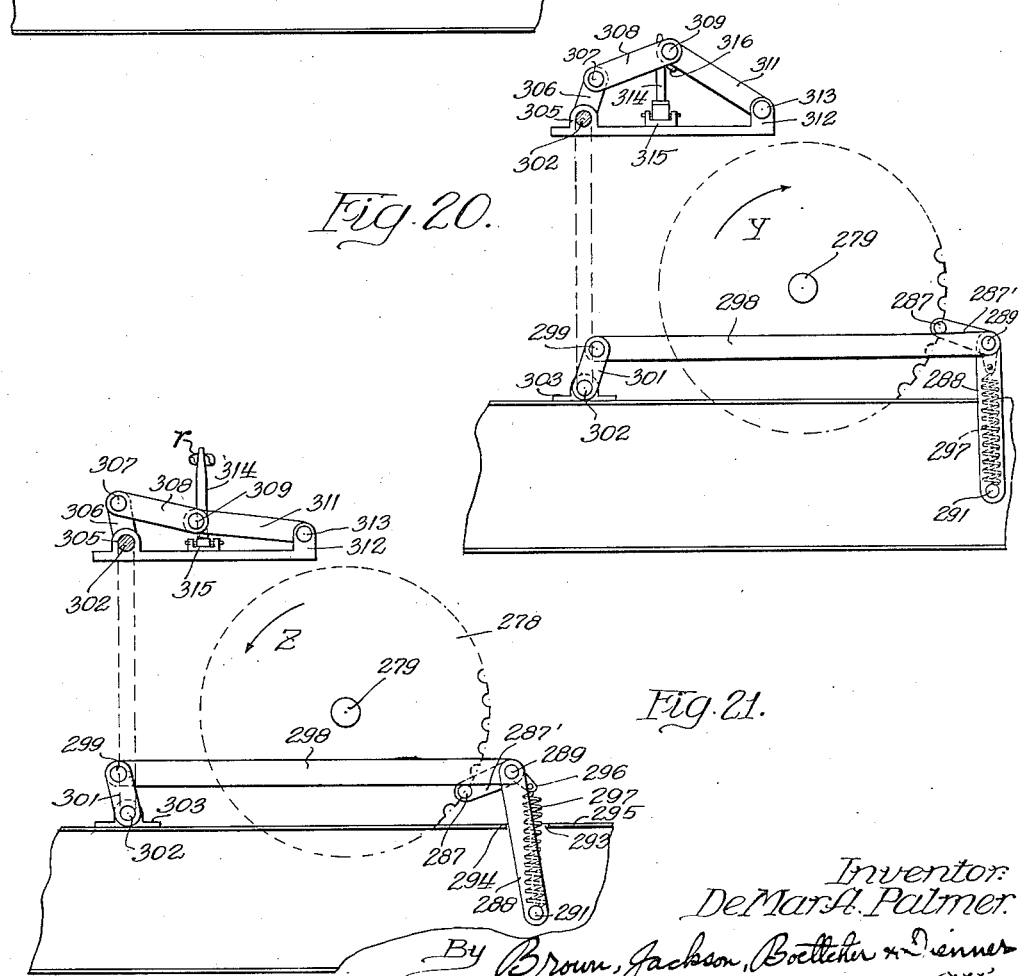

Oct. 20, 1936.   DE MAR A. PALMER   2,057,735
CONTROLLING MECHANISM FOR VEHICLE DUMP DOORS
Original Filed Nov. 10, 1930   7 Sheets-Sheet 7
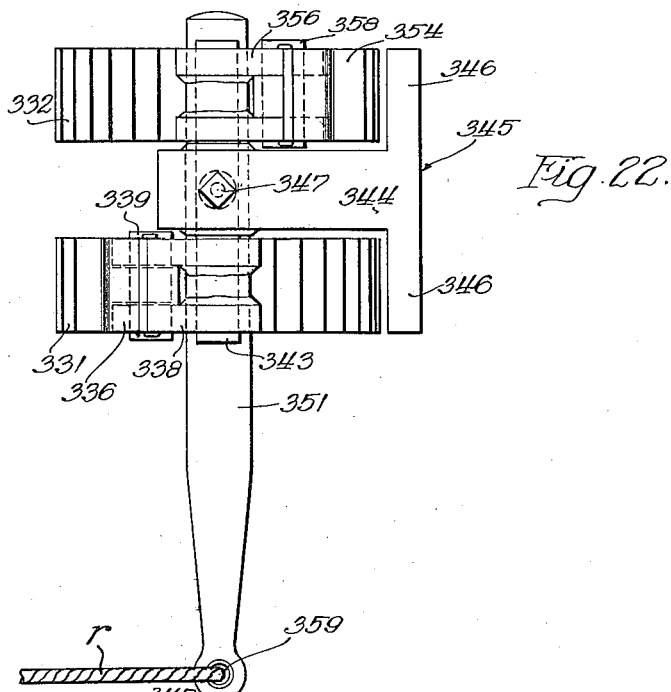
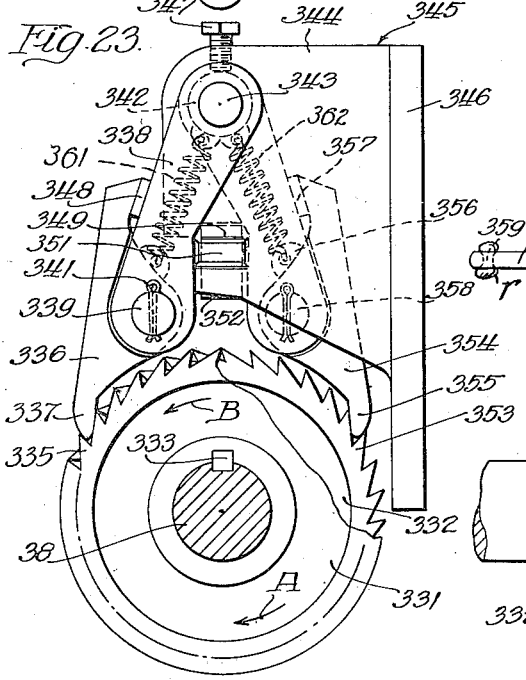
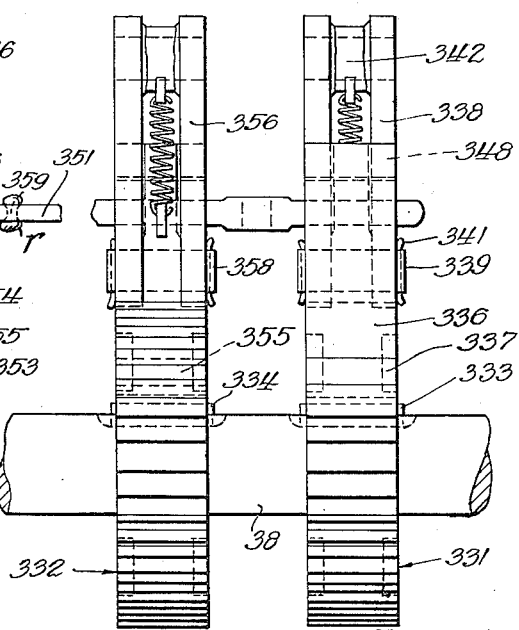
Inventor
De Mar A. Palmer
By Brown, Jackson, Boettcher & Dienner
Attys.

Patented Oct. 20, 1936

2,057,735

UNITED STATES PATENT OFFICE 2,057,735

CONTROLLING MECHANISM FOR VEHICLE DUMP DOORS

De Mar A. Palmer, Aurora, Ill., assignor, by mesne assignments, to Western-Austin Company, Aurora, Ill., a corporation of Illinois Application November 10, 1930, Serial No. 494,551
Renewed July 18, 1934

31 Claims. (Cl. 298—35)

The present invention relates to improvements in controlling and operating mechanisms for the dumping doors of load carrying vehicles. More particularly, the invention has reference to constructions wherein the weight of the load bearing downwardly on the doors is utilized when the doors are dumped to store energy in a spring mechanism, which energy is then employed for returning the doors to normal closed position after the dumping operation. It will be evident that this spring return mechanism has application to any type of dumping vehicle, and while I have shown the invention in its most general and probably preferred adaptation to wagons, carts and trailers having bottom dumping doors it will be understood that the invention is also applicable to railway dump cars.

One of the objects of the invention is to improve upon the mounting and arrangement of the spring mechanism in its relation to the vehicle bed, the doors and the door control mechanisms. Another object in this regard is to improve upon the operative connection between the door or doors and the spring mechanism, through which energy is stored in the spring mechanism in the dumping operation and then transmitted back to the doors for restoring them to closed position. According to one form of the invention, a winding shaft is extended transversely across one end of the vehicle, preferably the front end, and mounted on this shaft are winding drums or sheaves which have operative connection with the doors through chains or cables. In this form the spring mechanism is directly associated with this transverse winding shaft. According to another form of the invention separate shafts are extended longitudinally of the vehicle bed at each side thereof and are arranged to oscillate in the movement of the doors. The spring mechanism, in this form, is preferably operatively connected directly to each of these longitudinal shafts. The doors may be secured to said shafts, although in another form of this embodiment it is one of the objects of the invention to provide a lost motion relation between the doors and their respective longitudinal shafts so that the doors can have lateral play or oscillation for clearing the dumped pile of material after dumping without oscillating the shafts. According to another form of the invention the spring mechanism is embodied in a single drum preferably disposed at one end of the vehicle and on which drum the several chains or cables all wind.

Another object of the invention is to provide improved ratchet mechanism for controlling the dumping movement of the doors and for controlling the spring return movement of the doors. In a vehicle designed to carry large loads the stress on the ratchet mechanism is considerable and in this regard it is one of the objects to provide ratchet mechanism which can be easily released notwithstanding the relatively large forces effective thereon. Another object is to provide ratchet mechanism particularly adapted to remote control. For example, when one or more dump wagons or trailers are being towed behind a tractor it is of decided advantage for the operator of the tractor to be able to drop the dumping doors of the vehicle or vehicles and to restore these doors through the actuation of pull ropes extending to his position on the tractor. With the present ratchet mechanism the successive operations of first dumping the doors and then restoring the doors after the vehicle has been moved beyond the dumped pile can be easily and quickly effected through this remote control.

Another object of the invention is to provide dump door closing and control mechanism which is simple and reliable in operation and which does not necessitate for its use extensive departures from standard dump vehicle design. With respect to the latter, certain forms of my invention are readily adaptable as attachments to the older types of vehicles having manually actuated door return mechanism, as will hereinafter appear from the description of these different forms.

Other and further objects of the invention and features of novelty, will appear from the following detailed description of several preferred embodiments of the invention illustrated in the accompanying drawings in which:

Figure 1 is a fragmentary end elevation of a dump wagon or cart to which one preferred form of the invention has been applied;

Figure 2 is a schematic or diagrammatic view illustrating one arrangement of operating connections between the dumping doors and the spring wind-up mechanism;

Figure 3 is an elevation of one form of ratchet mechanism for controlling the doors, corresponding to the form shown in Figure 1, this view looking at the rear of the mechanism;

Figure 4 is a fragmentary side view taken from the left side of Figure 3 and illustrating the relation of the parts of the ratchet mechanism when the latter is in engaged or operative condition;

Figure 5 is a view similar to Figure 4 illustrating the parts in inoperative or released condition;

Figure 6 is a fragmentary side elevation of a modified form of ratchet mechanism for holding the doors in closed position;

Figure 7 is a front elevation of the mechanism disclosed in Figure 6;

Figure 8 is a side elevation of a ratchet mechanism for controlling the door return action of the spring wind-up mechanism;

Figure 9 is a front elevation of the mechanism disclosed in Figure 8;

Figure 10 is a side elevation of a modified form of ratchet mechanism transposable to effect restraining action for either dumping or closing movements of the doors;

Figure 11 is a front elevation of the device disclosed in Figure 10;

Figure 12 is a plan view of a bed of a load carrying vehicle illustrating a modified form of operating means for the dumping doors;

Figure 13 is an end elevation of the bed illustrated in Figure 12, a part thereof being shown in section taken substantially along the line 13—13 of Figure 12;

Figure 14 is an end elevation of another modified form of load carrying vehicle dumping door operating mechanism;

Figure 15 is a front elevation of the ratchet mechanisms employed to retain the doors of the embodiment illustrated in Figure 14 in load supporting position;

Figure 16 is a side elevation of one of the ratchet mechanisms shown in Figure 15, parts of the bed being shown in section, the section being taken substantially along the line 16—16 of Figure 15, the mechanism being shown in operative position in solid lines and in inoperative or released position in dotted lines;

Figure 17 is an end elevation of a load carrying vehicle bed embodying a further modified form of operating mechanism for the dumping doors;

Figure 18 is a fragmentary side elevation of the embodiment illustrated in Figure 17;

Figure 19 is a more or less diagrammatic illustration of the ratchet mechanism employed in conjunction with the embodiment of the invention illustrated in Figures 17 and 18, showing the mechanism in load supporting position;

Figure 20 is a view similar to Figure 19 illustrating the released position of the parts shown in said figure;

Figure 21 is a view similar to Figure 19 showing the parts in position to restrain the returning or closing effect of the operating mechanism illustrated in Figures 17 and 18.

Figure 22 is a plan view of another modified form of ratchet mechanism for controlling the operation of a spring wind-up mechanism such as is disclosed in Figures 1 and 2;

Figure 23 is a side elevation of the ratchet mechanism shown in Figure 22; and

Figure 24 is a front elevation of the ratchet mechanism shown in Figure 22 with the supporting bracket thereof omitted.

The general construction of the load carrying vehicle body or bed is not of the essence of the present invention and may be of any preferred or desired type. Figures 1 and 2 illustrate, by way of example, a dump wagon or cart comprising a frame 31, a load carrying bed or hopper 32 carried or supported thereon, and a pair of endless track laying or creeper tread units 33 on which the frame and bed are supported through arched axle brackets 34 extending outwardly and downwardly on opposite sides of the frame and intermediate the ends thereof. The open bottom of the bed 32 is normally closed by dump doors 35, 35 (Figure 2) which may have any suitable hinged or pivotal connection with the bed or frame, such for example, as by hinge eyes 36 secured to the outer edges of the doors and having swinging and vertically sliding engagement with suitable hinge brackets or bars 37 secured in spaced relation longitudinally of the side members of the main frame 31. This exemplary type of dumping vehicle is illustrated in the Benbow and Green Patent No. 1,706,099, granted March 19, 1929, to which reference may be had for a more detailed disclosure.

The improved mechanism for controlling or operating the dumping doors 35 comprises a transverse shaft 38 disposed at one end of the vehicle bed, preferably at the front end, and rotatable journaled in spaced bearing brackets 39 suitably secured to the bed. Although it is preferred to mount this shaft 38 upon the end of the vehicle bed, it will be readily understood that the shaft may be mounted in a similar manner upon the end member of the main frame 31. Mounted on the central portion of this shaft 38 are two spirally grooved winding drums or sheaves 41, 41, and two similar winding drums or sheaves 42 and 43 are suitably secured at the outer ends of the shaft. Winding upon the two intermediate drums 41 are chains or cables 44 which, as shown in Figure 2, extend down to approximately the meeting edges of the doors, from which they extend lengthwise of the doors, either through channels or tubular guides formed at the meeting edges of the doors, or under the doors in suitable guides thereon. The rear ends of the flexible members 44 are then connected to an equalizing member 45, which is in turn connected to a chain or cable 46 passing over a guide sheave 47, thence along the outer side and adjacent the top edge of the bed back to the winding drum 42 on the outer end of the shaft 38. When the vehicle is provided with separate front and rear pairs of dumping doors, as illustrated in Figure 2, a second winding drum 43 is provided at the other outer end of the shaft 38, and from this drum a cable or chain 48 extends rearwardly and is connected at its rear end to an equalizer 49. From this equalizer, two flexible elements, such as chains or cables 51 and 52 extend rearwardly and pass over guide sheaves 53 and 54, respectively, adjacent to the front and rear ends, respectively, of the rear pairs of doors. Flexible member 51 is connected at its rear end beyond the sheave 53 to an equalizer 55, which in turn is connected to the forward ends of two chains or cables 56 and 57. Chains or cables 56 and 57 pass through or under the rear pair of doors in the same manner as cables or chains 44, adjacent to the meeting edges of the doors, and the rear ends thereof are connected to an equalizer 58 in turn connected to the rear end of flexible member 52 beyond the sheave 54. In the four door type of vehicle, such as is shown in Figure 2, those portions of the flexible cables or chains 44, 46, 51, 56, and 57 extending down to the rear ends of the front doors and to the front ends of the rear doors, may pass through a hollow transverse partition dividing the vehicle into two load supporting compartments substantially as shown in the aforementioned Benbow and Green patent, in which partition these flexible members engage over suitable guiding rollers or sheaves as diagrammatically illustrated in Figure 2. It will be readily apparent from the foregoing that rotation of the shaft 38 in unwinding direction of the cables or chains is operative to lower the doors to dumping position, and rotation of such shaft in the opposite direction is operative to raise the doors to closed position. Of course this general idea may be employed with only one pair of doors in the wagon extending the full length of the bed. Such pair of doors might be controlled through a single chain 48 winding on one drum 43, or through two or more chains 44, 46 arranged to wind on two or more drums 41, 42.

Mounted concentrically of the shaft 38 and adjacent one end thereof, is a rather heavy helical spring 59 in which energy is stored by the tensioning thereof in the dumping operation, such energy being then employed for returning the doors to closed position. One end of said spring has anchored connection to the shaft 38 through a collar 61 suitably secured to the shaft 38, the other end of the spring 59 being anchored to an adjusting collar 62, which is normally preferably fixedly retained by suitable connection to one of the adjacent bearing brackets 39, but which may be released therefrom for rotation in either direction to increase or decrease the working tension of the spring 59. The spring is of such design and capacity that the weight of the load acting downwardly on the dumping doors when the latter are tripped, creates sufficient tension in the spring to raise the doors to closed position after the weight of the load is removed therefrom.

It is desirable that the doors be retained in positive closed position to support a load and upon dumping of the load, it is desirable that the doors be retained in open position until the vehicle is moved away from the pile of material deposited so that they may be freely returned to closed position without interference from the pile of material. To this end, the dumping of the doors is effected by the tripping of suitable ratchet mechanism, and in like manner, the spring actuated return of the doors to closed position is effected by the tripping of suitable ratchet mechanism. Two separate ratchet mechanisms may be employed, one for each operation, these two ratchet mechanisms being shown in the form of a unit in the embodiment illustrated in Figure 1 and each ratchet mechanism being illustrated in detail in Figures 3, 4 and 5; or the ratchet mechanisms may be of the type illustrated in detail in Figures 6 to 9, inclusive; or both ratchet functions may be combined in a single structure which is illustrated in detail in Figures 10 and 11.

Coming now to the first embodiment of the ratchet mechanisms illustrated in detail in Figures 3 to 5, inclusive, one of these mechanisms, designated generally at 63, is for controlling the spring return of the doors, and the other mechanism, designated generally at 64, is for controlling the dumping of the doors. Referring more particularly to Figure 3, the spring return ratchet mechanism 63 comprises a ratchet wheel 65, having peripheral inclined one-way ratchet teeth 66, fixedly secured to the shaft 38 by means of a key 67. The teeth 66 are adapted to cooperate with a ratchet pawl 68 having a hook nose or tip 69 (see Figures 4 and 5), such pawl being suitably journaled for pivotal movement in the plane of the ratchet wheel 65 and immediately thereabove, upon a laterally extending shaft or axle 71 extending from a supporting block 72 suitably secured to the end of the bed 32 above the shaft 38, the pawl being retained against endwise displacement from the shaft or axle 71 by a suitable cotter pin 73. A coil spring 74 having one end thereof anchored through a perforation in a depending ear 75 provided adjacent the upper end of the block 72, has its other end suitably anchored in a perforation of a forwardly extending ear or lug 76 provided upon the hub of the pawl 68. Such spring 74 constantly urges the hook or nose 69 of the pawl 68 to engage the teeth 66 of the ratchet wheel 65. A laterally extending pin 77 is fixed at the outer end of the pawl 68 above the gripping portion of the nose or tip 69 and has pivotally connected thereto a forwardly extending link 78 suitably retained from displacement from the pin 77 by means of a cotter pin 79. Link 78 is provided with a longitudinally extending slot 81, the purpose of which will be hereinafter described.

The dumping ratchet mechanism 64 comprises a similar ratchet wheel 82 provided with peripheral inclined one-way teeth 83, the wheel 82 being likewise fixedly secured to the shaft 38 adjacent the wheel 65 by means of the key 67. Inasmuch as the wheel 82 is adapted to be effective in the opposite direction from the operative effect of the wheel 65, its teeth 83 are inclined in the opposite direction from the teeth 66 of the wheel 65. The pawl means cooperating with the ratchet wheel 82 is supported from a laterally extending pin or axle 84 threaded into the block 72. This pin or axle 84 carries thereon and depending therefrom, two spaced parallel links 85 and 86, link 86 being retained against longitudinal displacement along the pin or axle 84 by means of a pair of flanking cotter pins 87 passing through the pin or axle 84. The link 85 is retained against outward displacement upon the pin or axle 84 by means of a suitable cotter pin 88. At their lower ends, the links 85 and 86 have journaled therein a pin or shaft 89 retained against displacement by means of cotter pins such as 91 passing through the pin or shaft 89 adjacent the ends thereof and on the outer sides of links 85 and 86. Pin or journal 89 carries thereon and pivotally connected thereto a pawl 92, the hub portion 93 of which acts to space the lower ends of the links 85 and 86. Pawl 92 is provided at one end with a tooth engaging tip or nose 94 to one side of the hub 93, while the other end thereof is somewhat longer and is provided at its outer extremity with a suitable eye 95 through which one end of a pull rope or cable r may be connected. This tripping rope extends up to the operator's position on the tractor or other pulling vehicle, thus enabling the ratchet mechanism to be tripped by direct actuation of the pawl arm 92 at the wagon, or to be tripped from a more or less remote point, such as on the tractor, through the rope r. Link 85 is provided at its upper end with a rearwardly extending arm 96 in the end of which one end of a coil spring 97 is suitably anchored, the other end of the spring being anchored in a lug or projection 98 disposed adjacent the hub 93 of the pawl 92 and between said hub and the eye 95 at the outer extremity thereof.

It will be noted from Figure 3 that since the pawl 68 is substantially the same thickness as the wheel 65, the slotted link 78 extends over into a space above the wheel 82. The hub 93 of the pawl 92 is provided with an upwardly and rearwardly extending arm or projection 99 which carries a pin 101 adjacent its extremity, said pin extending into the slot 81 of the link 78 providing a lost motion connection between the arm or projection 99 and the link 78.

The operation of the above described ratchet mechanisms is as follows: Under load supporting condition, the shaft 38 is urged to rotate in the direction indicated by the arrow A indicated in Figures 4 and 5. At this time the ratchet pawl means are in the positions shown in Figure 4, the tip or nose 69 of the pawl 68 being in engagement with one of the teeth 66 of the wheel 65, since the pawl 68 is normally urged to engaging position by the spring 74. The pawl 92 is in the position shown by virtue of its being drawn toward its ratchet wheel 82 by the spring 97. It is, of course, readily apparent that since the toggle pin 89 upon which the pawl 92 is carried, is beyond its dead center relation with respect to a line connecting the contact point of nose 94 with teeth 83, pawl 92 will prevent the rotation of the shaft 38 in the direction of the arrow A. When it is desired to trip the ratchet mechanism to permit rotation of the shaft 38 in the direction of the arrow A to permit dumping of the load, such mechanism is tripped by a forward pull of the rope r which exerts an outward pull upon the eye 95 of the pawl 92. Upon exertion of such outward pull upon the pawl 92, the tip or nose 94 is caused to ride upwardly upon the teeth 83 of the ratchet wheel 82. The pawl 92 is retained in its released position as the ratchet wheels 65 and 82 rotate in the direction of the arrow A to permit dumping movement of the doors under load, the retention of the pawl 92 in this position acting through the link 78 to hold the nose 69 of the pawl 68 out of engagement with the teeth 66 on the ratchet 65. When the doors have reached their maximum dumped position, pawl 92 is automatically brought back to its original position as shown in Figure 4, by spring 97, but as the pawl 92 is moved back to its initial position, the pawl 68 is released and is also moved by the spring 74 back into its original position, in engagement with the teeth 66 on the ratchet member 65. Thus, pawl 68 will be effective upon completion of the dumping operation to restrain spring return rotation of shaft 38, the direction of such return rotation being indicated by the arrow B.

At this time, the dumping doors are therefore retained in dumping position until the vehicle is moved away from the pile of dumped material. To permit spring return movement of the doors to closed position and consequent rotation of the shaft 38 in the direction of arrow B, the ratchet mechanisms are again tripped by pulling on rope r which again causes outward swinging of the pawl arm 92, the parts thus assuming the position shown in Figure 5. During swinging movement of pawl arm 92, arm 99 is rotated about its pivot 89 causing the pin 101 to slide in the slot 81 of the link 78 until it engages the outer end of such slot. Continued rotation of pawl 92 causes the pin 101 to draw the link 78 outwardly, thereby releasing the tip or nose 69 of the pawl 68 from the teeth 66 of the cooperating ratchet wheel 65. Upon release of such wheel 65, spring return rotation of shaft 38 in the direction indicated by the arrow B is permitted whereupon the doors of the vehicle are restored to closed position. Upon completion of the spring return movement of the doors, the operator may release pawl 92. Upon release of the pawl 92, spring 74 urging the pawl 68 to rotate to engaged position of the nose or tip 69 thereof with the teeth 66 of the cooperating ratchet wheel, causes the pawl 68 to exert a pull upon the pin 101, which in turn tends to impart rotational movement to the arm 99 about the pin 89. Spring 97 at the same time tends to impart rotational movement to the pawl 92 about the pin 89 in the same direction. Thus, the nose or tip 94 of the pawl 92 is given rapid pivotal movement to return position and, in moving to such position, the beveled side of the nose or tip 94 rides freely over the teeth 83 of the ratchet wheel 82. When the pawl 92 has reached its maximum return position, it engages one of the teeth 83, thereby becoming again effective to restrain rotation of the shaft 38 in the direction of the arrow A. It will be noted from Figure 4 that the outer end of the pawl 92 is provided with a stop projection 92', which is adapted to engage a stop projection 85' on the forward side of the upper end of link 85, thereby limiting the inward movement of the pawl 92. In the position indicated in Figure 4, the pivot pin 89 is beyond the line connecting the center of the pin 84 and the point of engagement between the nose or tip 94 of the pawl 92, thereby being beyond "dead center" and the toggle connection thus formed is locked. Thus, dumping rotation of shaft 38, that is, in the direction of the arrow A, is prevented.

The parts of the operating and controlling mechanism are thus now restored to original condition whereupon the vehicle may be again loaded.

It will be noted that tripping of the ratchet mechanisms in both directions, mainly, to release the doors to dumping position and to return the doors to closed position, is accomplished in each instance by the same direction of movement of the pawl arm 92. Thus, one remote control connection, such, for example, as the tripping rope r, suffices for tripping the ratchet mechanisms to permit either directional rotation of the shaft 38, it merely being necessary to pull on this rope for each dumping operation and for each restoring operation. Such enables the operator of the tractor to dump the doors and to restore the doors without leaving his seat on the tractor, and, if desired, also to perform these operations while the tractor and dumping vehicle are in continuous motion. Furthermore, where two or more dumping vehicles are coupled in a train drawn by a single tractor, the tripping ropes r from each of the dumping vehicles may be extended forwardly to the operator's position on the tractor; or, where a wagon man is employed to control the operations of a train of wagons, these tripping ropes may be extended to his position on one of the wagons. The inherent flexibility of these tripping connections established through said ropes or chains, which need only be pulled in the tripping operations, avoids all complication in relative turning and backing movements between the tractor and dumping vehicles and in coupling and uncoupling the tractor and any one or more dumping vehicles. Furthermore, it will be noted in this regard that the toggle lock established for the pawl 92 is self-restoring or automatic in resuming the locked toggle relation, which is a feature cooperating with the remote control effected through the flexible tripping rope r.

Referring now more particularly to Figures 6 to 9, inclusive, I have illustrated another arrangement of control mechanisms for the shaft 38 employing two ratchet mechanisms, one of these mechanisms, designated 103, being employed for controlling the dumping of the doors, and the other mechanism, designated 104, being employed for controlling the spring return of the doors. Referring to Figures 6 and 7, the dumping ratchet mechanism 103 comprises a ratchet wheel 105 fixedly secured to the shaft 38 by means of a suitable key 106, and having provided in the periphery thereof a plurality of peripheral pockets forming regular ratchet teeth 107 adapted to cooperate with a ratchet pin 108 rotatably carried by a pair of spaced bell crank levers 109. These levers 109 are pivotally mounted upon a pin 111 in the U-shaped upper end of a lever 112, which is pivotally supported intermediate its ends upon a pin 113 carried in turn by the upper ends of a pair of spaced ears 114 on a bracket 116 secured to the end of the bed. Also pivotally supported upon bracket 116 in the lower ends of ears 114 is a pin or shaft 115 approximately at the center point of which, between the ears 114, and spaced from such ears by a pair of bushings 117, is a tripping lever 118 adapted to engage the lower end 119 of the toggle lever 112. Tripping lever 118 is suitably secured to the pin 115 to rotate therewith, pin 115 extending outwardly beyond and laterally of one of the ears of the bracket 116, and carrying at its extreme end an operating lever 121 fixedly secured thereto in any suitable or desired manner and spaced from the adjacent ear 114 by means of a suitable bushing 122, lever 121 being provided at its upper extremity with a suitable perforation 121' for the reception of a suitable remote control connection such for example as a rod or a tripping rope r'. A stop shoulder 123 on the tripping lever 118 is adapted to engage a stop shoulder 124 for limiting counterclockwise oscillation of the lever 118 about the pivot pin 115 as viewed in Figure 6. A tension spring 125 is connected between the extension 119 of the toggle lever 112 and the bracket 116 for normally urging the stop shoulders into engagement with each other. Reverse or counterclockwise oscillation of the lever 112 is limited by the engagement of the forked arms of said lever with suitable stop shoulders 126 provided on the inner sides of bracket ears 114 thereby limiting outward movement of the lever 118 beyond a predetermined point.

In the normal position of the parts of the ratchet mechanism 103 with the vehicle loaded, the weight of the load acting on the doors tends to impart a rotative movement to the shaft 38 tending to revolve the ratchet wheel 105 in the direction indicated by the arrow A (see Figure 6). The inwardly directed arms 127 of the bell crank levers 109 are connected together by a suitable pin 128 to which one end of a coil spring 129 is anchored, the other end of said spring being suitably anchored to the pivot pin 113 of the lever 112. The bell crank levers 109 and the lever 112 function as a toggle for holding the ratchet pin 108 in engagement with the wheel 105 for holding the latter against rotation. When it is desired to drop the dumping doors, a pull on the tripping cable r' connected to the lever 121 oscillates such lever in a clockwise direction, swinging the lower end of the lever 112 outwardly and carrying the pivot pin 111 inwardly so as to swing the ratchet pin 108 in a clockwise or outward direction with respect to the pivot pin 111. As the pin 111 is swung to the left beyond dead center relation with respect to the pins 108 and 113, as viewed in Figure 6, the wheel 105 rotates in the direction of the arrow A, carrying the pin 108 around the pivot 111 as a center and tensioning the spring 129. As the wheel 105 continues to rotate in the direction of the arrow A or dumping direction, the pin 108 oscillates idly into and out of the ratchet teeth 107, the toggle arrangement being ineffective until the dumping operation is completed. After the load has been dumped and the other ratchet mechanism 104 (which will be presently described in detail) has been tripped for returning the doors to closed position, the reverse rotation of the ratchet wheel 105 will result in restoring the parts to the position shown in Figure 6, the pin 108 being carried around by one of the teeth of the wheel 105 and as the ratchet wheel continues to rotate in the direction opposite to that indicated by the arrow A, the pin 108 oscillates idly into and out of the ratchet teeth, the toggle arrangement being ineffective in this direction. The bell crank levers 109 have stop lugs 130 adapted to strike the rear edges of the toggle lever 112 for limiting the backward oscillation of the bell crank levers relative to the toggle lever as the pin 108 oscillates into and out of the ratchet teeth. During each oscillation of the pin 108 in the spring return movement of the wheel 105, both levers therefore oscillate backwardly and forwardly under the tension of the spring 125. After the doors have been returned to closed position and another load deposited in the bed of the vehicle, the weight of the load then tends to rotate the wheel 105 in the direction of the arrow A again, and since the toggle arrangement is effective in this direction, the load will be retained in the bed by the restraining effect of the ratchet mechanism 103 preventing the dumping movement of the doors.

Referring now to the ratchet mechanism for controlling the return of the doors to closed position, it will be seen from Figures 8 and 9 that this mechanism also comprises a ratchet wheel 131 fixedly secured to the shaft 38 by means of a suitable key 132 and having a plurality of peripheral notches defining peripheral teeth 133 adapted to cooperate with a ratchet pin 134 mounted in the bifurcated upper end of a lever 135. This lever is pivotally supported upon a pin 136 between the upper ends of two parallel arms 137, the lever having its leg 138 offset in angular relation with respect to the forked end as will be evident from Figure 8. The lower ends of the arms 137 are pivotally supported upon a pin 139 carried by a pair of spaced ears 141 extending forwardly on a bracket 142 supported at the end of the bed. The lower ends of the arms 137 are maintained in spaced relation by a suitable hub 143, carried by the pin 139 extending therethrough. Also supported in the bracket 142 is a shaft 144 to the outer end of which a tripping lever 145 is secured, the lever being maintained in spaced relation from the adjacent bracket ear 141 by a suitable bushing 146. The upper end of lever 145 is provided with a suitable perforation 147 for the reception therein of one end of a suitable operating rope, cable, or chain r permitting of remote control by an operator positioned at a distance from the bed. Between the ears 141 of the bracket 142, the shaft 144 is provided with an upwardly and forwardly extending camming lever 148 suitably secured to the shaft 144. To retain the shaft against outward displacement and to thereby retain the camming lever 148 for movement in a fixed plane, a plurality of bushings 149 are carried by the shaft 144, each being disposed between one side of the camming lever 148 and the near side of the adjacent ear 141. The upper end of lever 148 is adapted to slidably engage the depending leg 138 of the forked lever 135. A suitable coil spring 151 has one end thereof suitably anchored to the end of the bed in an ear 152 extending forwardly therefrom, the other end of the spring 151 being suitably anchored to the hub of lever 135. This spring tends to constantly urge the pin 136 inwardly toward the end of the bed. Movement rearwardly or toward the bed is limited by the engagement of the hub portion of the lever 135 with a forwardly extending stop portion 150 suitably secured to the end of the bed thereby limiting the rearward movement of the toggle connection formed by the levers 135 and 137. To limit the clockwise or outward swinging movement of the cam lever 148, the lever is provided at its lower end with a depending lug 153 which is adapted to engage a forwardly projecting lug 154 extending from the base of the bracket 142. A tension spring 155 connected between the lever arm 138 and the bracket 152 tends to rotate the toggle lever 135—138 clockwise to its normal position illustrated.

With the doors in dumped position, the energy stored in the return spring tends to revolve the shaft 38 and consequently the wheel 131 in the direction indicated by the arrow B in Figure 8. This creates a downwardly acting force in the ratchet pin 134 tending to hold the two toggle members 135 and 137 toward each other, urging the pin 136 toward the bed end. At this time, the pin 136 is beyond the dead center line connecting the axes of pins 139 and 134 toward the bed end, so that the forces tending to rotate the ratchet wheel 131 in the direction of the arrow B are transmitted to the leg 138 of the lever 135, this leg tending to impart counterclockwise rotational movement to the cam lever 148. The latter is, however, held from rotation in such direction by the engagement thereof with the hub 143 on the fixed pin 139. Thus, the toggle arrangement is effective to restrain rotation of the shaft in spring return direction. A pull on the tripping rope, cable or chain r connected to the tripping lever 145 oscillates the arm or cam lever 148 in a clockwise direction and upon movement of the leg 138 of the forked lever 135 forwardly, the knuckle pivot pin 136 is forced forwardly into a past center relation to the line connecting pins 134 and 139, whereupon the toggle pulls forwardly and downwardly, freeing the ratchet pin 134 from the ratchet wheel 131. This allows the doors to be restored to closed position under the influence or action of the return spring. When the doors are again moved to dumping position, resulting in reverse rotation of the wheel 131, namely, in the direction indicated by the arrow A (see Figure 6), the ratchet pin 134 idly moves into and out of the pockets of the wheel, the spring 151 permitting forward oscillation of the toggle arrangement. When the doors reach the maximum dumped position and the spring return means exerts its effect upon the shaft 38, in the direction of the arrow B, the toggle joint is again held in locked relation as shown in Figure 8.

It will be readily apparent that both ratchet mechanisms 103 and 104 are effectively tripped by a movement of the tripping lever of each in the same direction whereby an operator located forwardly of the bed of the vehicle may readily control the effective positions of the two control ratchet mechanisms by exerting a pull on the remote control connections in the same direction. Separate pull ropes r' and r'' may be connected to each tripping lever 121 and 145, or a single rope r may be branched to connect to both levers. It will also be noted that in the constructions shown in Figures 6, 7, 8 and 9 the toggle is likewise self-restoring or automatic in resuming the locked toggle relation, as described of the toggle lock for the pawl 92 in Figures 3, 4 and 5.

In Figures 10 and 11, I have shown a single ratchet arrangement effective to control both the dumping operation and the spring return operation. It will be seen that this mechanism, generally indicated 161, also comprises a ratchet wheel 162 having peripheral notches therein defining regular peripheral teeth 163, such wheel being fixedly secured to the shaft 38 by means of one or more keys 164, the teeth 163 being adapted to cooperate with a ratchet pin 165 carried in the bifurcated upper end of a lever 166 of substantially U-shaped configuration, the intermediate portion 167 of which is journaled upon a pin 168 mounted in the bifurcated upper end of a link 169. Pin 168 has its ends extending beyond the legs of the bifurcated link 169. A pair of parallel links 171 have their outer ends pivotally connected to the outer ends of the pin 168. The inner ends of these links are pivotally connected to the upper end of a bracket 173 secured to the vehicle, a pin 174 constituting such pivotal connection. The lower end of link 169 is pivotally connected to the upper bifurcated end of a similar link 175 by means of a pin 176. This pin extends outwardly beyond the outer leg of the link 175 for a purpose to be hereinafter described. The lower end of link 175 is pivotally connected to the bracket 173 between a pair of ears 177 at the lower end of the bracket by means of a pin 178. Link 175 is provided with a lug or extension 179 to which one end of a coil spring 181 is anchored, the other end of such coil spring being anchored in a lug 182 provided upon the bracket 173. Spring 181 draws the knuckle pin 176 inwardly toward the bracket causing the extending end of the pin 176 to engage a forwardly extending ear 183 provided on the bracket 173, said ear constituting a support for an operating or tripping lever 184 pivotally carried thereby upon a pin 185. With the spring 181 holding the knuckle pivot pin 176 against the ear 183, this knuckle pivot lies slightly to the rear of a line extended between the upper and lower pins 168 and 178 respectively. Hence the toggle joint formed by the links 169 and 175, is held in locked position, the upper member 166 being prevented from swinging to a ratchet releasing position by the engagement of the pin 176 with the ear 183. The intermediate portion 167 of the upper member 166 is provided with a downwardly extending lug 186 to which one end of a coil spring 187 is anchored, the other end of said spring being anchored in an outwardly extending lug 188 provided upon the journaled intermediate portion connecting the lower ends of the link 169. This spring has a tendency to normally urge the upper member 166 to align itself radially of the ratchet wheel 162, which in the illustrated arrangement means that the spring tends normally to swing the member 166 into a substantially vertical plane. This spring biasing action tends to hold the ratchet pin 165 in the teeth of the ratchet wheel irrespective of whether said pin is swung to one side or the other of the pivot 168. A stop 171' carried by the links 171 is adapted to strike a stop 173' on the bracket 173 for limiting the downward movement of the pivot 168 when the ratchet pin 165 swings past center. Preferably these stops are arranged so that the pin 165 can just clear the periphery of the ratchet wheel, although they might be arranged so that this pin would remain in one of the ratchet pockets as the pin was carried past center. The lower end of the tripping lever 184 is provided with a suitable perforation 189 for the reception therein of a tripping rope, chain, or cable r providing a remote control connection for an operator. When this door controlling mechanism is mounted at the rear end of the vehicle, the tripping rope r may be extended back directly to the aperture 189 in lever 184, or a pull rod may be linked to this aperture and extended forwardly along the side of the wagon in suitable guides, with the tripping rope connected to the front end of this rod. In Figures 3 to 9, inclusive, the winding shaft 38 and associated ratchet mechanism is shown in each instance as being at the front end of the vehicle, but obviously this same mechanism may be arranged at the rear end, it only being necessary then to change the manner in which the tripping rope is extended to the tripping lever, or to project these levers in the opposite directions from their pivots. The construction illustrated in Figures 10 and 11 may be mounted at the front end, but to illustrate the other arrangement I have shown the ratchet mechanism 161 as mounted at the rear end of the bed of a load carrying vehicle, in which case the door operating shaft 38 is mounted at such rear end.

A pull on the tripping rope r connected to the tripping lever 184, oscillates the upper end of such lever rearwardly or in a counterclockwise direction as viewed in Figure 10, thereby forcing the knuckle pivot 176 rearwardly into a past center relation to the line extended between the upper and lower pins 168 and 178, whereupon the toggle connection folds rearwardly and downwardly moving the pin 168 downwardly about the pin 174 as a center due to the links 171, thereby freeing the ratchet pin 165 from the teeth 163 of the wheel 162. The wheel 162 and its associated shaft 38, are now free to rotate in the direction indicated by the arrow A in Figure 10 to permit the dumping of the load. As the wheel 162 rotates in such direction, the tooth with which the pin 165 was in engagement prior to the tripping of the ratchet mechanism as shown in full lines in Figure 10, carries the lever member 166 around to the dotted line position as shown in such figure, said pin 165 idly oscillating into and out of the ratchet teeth 163, the toggle arrangement then being ineffective in this direction. After the tripping of the mechanism for load releasing effect, the operator may promptly release the tripping lever 184, the spring 181 being promptly effective to return the knuckle pin to its original past center position with respect to the line connecting the pins 168 and 178 toward the bracket 173. After the load has been dumped, and the spring return mechanism tends to rotate the wheel 162 in the direction of the arrow B, the toggle arrangement will be effective in such direction (the dotted line position of lever 166 in Figure 10), since the toggle joint is at this time in locked position. A pull on the tripping rope, cable, or chain r connected to the tripping lever 184 oscillates the upper end of such lever rearwardly as before thereby forcing the knuckle pivot 176 outwardly causing the toggle to fold rearwardly and downwardly thus freeing the ratchet pin 165 from the teeth 163 of the wheel 162. This allows the doors to be restored to closed position under the action of the spring return means. During the spring return rotation of the wheel 162 in the direction indicated by the arrow B, the pin 165 is carried around to the full line position as shown in Figure 10 and as the wheel continues in this direction, the pin 165 idly moves into and out of the pockets of the wheel, the spring 187 permitting oscillation of the lever member 166. Before the closing operation is completed, the operator may release the lever 184 permitting the spring 181 to bring the toggle knuckle pivot pin 176 back to a past center position with respect to a line connecting the pins 168 and 178, the pin 176 being stopped in this direction by the engagement thereof with the ear 183. The ratchet pin 165 is, of course, ineffective in the full line position thereof in the direction of rotation of the wheel 162, as indicated by the arrow B, and the doors are thus returned to closed position. As soon as the bed of the vehicle is loaded whereupon rotative force in the direction of the arrow A is transmitted to the wheel 162, the pin 165 drops into one of the pockets in the periphery of the wheel 162 thereby engaging one of the teeth 163 and since at this time the toggle joint is in locked position, the pin 165 will be effective to restrain rotation of the wheel 162 in the direction of the arrow A.

Thus it will be seen that the ratchet mechanism 161 comprises a single ratchet wheel with which a single pawl cooperates, the latter being transposable or reversible to be effective to restrain rotation of the wheel and the associated shaft in either direction of rotation. It will be further noted, that the tripping of this ratchet mechanism is accomplished by a movement of the tripping lever in one direction, such tripping action being effective to permit transposition of the pawl means to render it effective to control rotation of the operating shaft in either direction. The toggle parts for this pawl means are also self-restoring to a locked relation.

While I have shown the ratchet mechanism 161 as applied to the rear end of a bed, it will be readily apparent that the mechanism may be employed at the forward end of a bed, in which case a suitable direction change pulley may be provided for the flexible remote control means, or an additional lever may be provided to accommodate such direction change of the remote control rope, cable, or chain r.

Referring now to Figures 12 and 13, I have illustrated another embodiment of my invention incorporating the above noted features of operating the dumping doors of a load carrying vehicle of the type illustrated in the Benbow and Green patent above noted, and control mechanisms for such operating means. In the instant exemplary construction of the dump wagon or cart illustrated, the vehicle generally comprises a frame 201, a load carrying bed or hopper 202 supported thereon, and two endless track laying or creeper tread units 203 on which the frame and bed are supported through suitable arched axle brackets extending outwardly and downwardly from the frame intermediate the ends of the bed. The open bottom of the bed 202 is normally closed by dump doors 204 which have any suitable hinged or pivotal connection with the frame or bed, such, for example, as by hinge eyes 205 secured to the outer edges of the doors and having swinging and vertically sliding engagement with hinge brackets or bars 206 fixedly secured to the longitudinally side members of the main frame 201.

Inasmuch as the improved mechanism for controlling the dumping doors 204, 204 are alike except, that one is necessarily right and the other left, a detailed description of one of these mechanisms will suffice. The improved mechanism comprises a longitudinally disposed shaft 207 suitably journaled along the longitudinal side member of the main frame 201 in suitable spaced bearing brackets 208 secured either to the bed or to the frame. Shaft 207 carries fixedly secured thereto a pair of downwardly and inwardly extending arms 209 in spaced relation thereon, each of these arms being provided at its inner end with an upwardly extending projection 211 adapted to engage the underside of the corresponding door in the normal closed position of the dumping doors. These arms are positioned so as to have the load supported by the doors 204 proportionately distributed between them and in the embodiment disclosed, they are preferably positioned one adjacent each end of the corresponding door. The projections 211 of each of the arms have free engagement with the undersides of the corresponding doors for a purpose to be hereinafter described. One end of each of the shafts 207 extends outwardly beyond the respective end of the bed 202, preferably the front end of the bed, although it will be understood that these extending ends of the shafts 207 may extend outwardly beyond the rear end of the bed. Mounted concentrically of each shaft 207 and at the outwardly extending end thereof, is a rather heavy helical spring 212 in which energy is stored in the dumping operation of the corresponding door, which energy is then employed for returning the door to closed position. One end of said spring has anchored connection to said shaft in any suitable or desired manner such, for example, as a collar (not shown) which is fixedly attached to such end of the spring and the shaft. The other end of said spring is anchored to an adjusting collar 213 which may have any suitable or desired connection to a bearing or other support for the outer end of the shaft and which may be rotated in either direction to increase or decrease the initial working tension desired of the spring 212. The spring is so arranged and is of such capacity that the weight of the load acting downwardly on the dumping door when the latter is tripped is sufficient to store tension in the spring to raise the door to closed position after the weight of the load is removed from the door.

In the embodiment disclosed, the dumping of the doors is effected by the tripping of a ratchet mechanism, and likewise the spring actuated return of the doors to closed position is effected by the tripping of a ratchet mechanism. Two separate ratchet mechanisms may be employed, one for each operation, these two ratchet mechanisms being shown in the embodiment illustrated in Figure 12. One of these mechanisms, designated 214, is for controlling the dumping of the doors, and the other mechanism, designated 215, is for controlling the return of the doors. The dumping ratchet mechanisms 214, each comprise a suitable latch or pawl means adapted to cooperate with a suitable rack disposed upon the adjacent end edge of the corresponding door in proximity to the longitudinal meeting edge of such door. These ratchet mechanisms 214, 214 may be of any preferred or desired structure but in view of the considerable weight of load adapted to be supported by the dumping doors in vehicles of the character hereinbefore noted, I prefer to employ ratchet mechanisms of the character shown in Figure 16, a more detailed description of which follows. The spring return control ratchets 215, 215 may be of any suitable or desired construction. If desired, the dumping ratchet mechanisms 214, 214 may be dispensed with and the double ratchet mechanisms disclosed in Figures 3 to 5, inclusive, 6 to 9, inclusive, or 10 and 11, and hereinbefore described, may be employed in the place of the ratchet mechanisms 215, 215.

Referring now more particularly to Figure 13, it will be seen that in the normal closed positions of the doors 204, the projections 211 of the arms 209 are in engagement with the undersides of the corresponding doors, the latter being at this time retained against dumping operation by the dumping ratchet control mechanisms. When these control mechanisms are released, the weight of the load moves the doors to dumped position and the force of such movement is transmitted through the arms 209 to the shafts 207, causing such shafts to be rotated in a direction to wind or tension the springs 212. When the doors 204 are moved to their maximum dumping positions, the spring return means is rendered ineffective to return the doors to closed position by the spring return ratchet mechanisms. At this time the doors and arms are in the dotted line positions, indicated in Figure 13. Before the doors are returned to closed position, the vehicle is moved away from the deposited pile of material. The material may be of such a nature as to interfere with the free movement of the vehicle due to the engagement of the meeting edges of the doors with the pile of material. Since in the present embodiment, the doors in their dumped positions are free to oscillate away from the end portions 211 of the arms 209, the vehicle will be free for unimpeded movement away from the pile of deposited material. Upon tripping of the spring return ratchet mechanisms, the doors are returned to closed position, at which time the dumping ratchet control mechanisms become effective to again retain the doors in closed position under load condition.

When the vehicle has two or more pairs of dumping doors extending the length of the bed, the operating and control mechanisms just described may be readily adapted to such vehicles. If it is desired to operate all of the pairs of the doors in unison, one pair of shafts each provided with an appropriate number of arms may be employed. If it is desired to operate the pairs of doors independently of each other, separate operating units may be employed for each pair of doors. In this case, each set of operating mechanisms may be provided with independent control means. While the shafts have been shown as having their ends extending outwardly beyond the front end of the bed of the vehicle in Figures 12 and 13, as previously stated this arrangement may be reversed, and in the case of two pairs of front and rear, independently actuatable, doors two pairs of shafts may be employed projecting from both ends of the bed and provided with springs and ratchets for independently controlling the two pairs of doors.

Referring now more particularly to Figures 14 to 16, inclusive, I have illustrated another modified construction embodying the salient features of the present invention, including a novel arrangement of operating and control means for the dumping doors. Referring more particularly to Figure 14, I have illustrated more or less diagrammatically the arrangement of parts comprising such modified structure. In this case, the bed of the vehicle is substantially that of the modification disclosed in Figures 12 and 13, the bottom of the bed being adapted to be closed by a pair of swinging doors 221 supported for swinging movement longitudinally of the usual frame upon shafts 222 suitably journaled on the longitudinally extending side members of the main frame. Each of these shafts 222 extends outwardly beyond one end of the bed and such extending end carries thereon and concentrically with respect thereto, a rather heavy coil spring 223 in which energy is stored in the dumping operation, such energy being then used for returning the doors to closed position, the spring being mounted substantially in the manner shown in Figures 12 and 13, although any other suitable or convenient mounting, connecting means and adjusting means may be employed. As in the cases of the previous modifications heretofore described, the spring is so arranged and is of such capacity that the weight of the load acting downwardly on the dumping doors 221 when the latter are tripped acts to tension the spring whereby sufficient energy is stored therein to raise the doors to closed position after the weight of the load is removed from the doors.

Each of the shafts 222 carries upon its outwardly extending portion and adjacent to the corresponding end of the vehicle bed, a suitable ratchet wheel 224 provided with peripheral inclined one-way teeth 225 cooperating with a ratchet pawl 226 carried in the forked lower end of a bell crank lever 227 by a suitable pin 228. This lever is pivotally mounted at 229 at its intermediate portion in a bracket 231 suitably secured to the outwardly extending flange 232 provided at the end of the bed. At its other end, lever 227 is provided with an upwardly extending projection 233 adapted to be engaged by a suitable eccentric cam 234 carried by a horizontally disposed shaft 235 suitably journaled in a pair of spaced bearing brackets 236 carried on the upper side of the bed ledge or flange 232.

A coil spring 237 has its upper end suitably anchored to the lower side of the ledge or flange 232, the other or lower end being suitably anchored to the bell crank lever 227 adjacent its lower end as by being secured to the journaled intermediate portion of the pawl 226. The pawl 226 is provided at its inner end and extending upwardly, with a suitable stop portion 238 adapted to engage the inner edge of the bell crank lever 227 to limit the inward movement of the pawl 226. It will be readily apparent that the bell crank lever 227 is constantly urged to swing outwardly under the influence of the spring 237 whereby the nose or tip of the pawl 226 will be maintained in yielding engagement with the teeth 225 of the ratchet wheel 224.

As the doors 221 are moved to dumping position under the weight of the load, the pawl 226 will idly oscillate over the ratchet teeth 225 until the spring 223 becomes effective to move the doors to closed position. At this time the pawl 226 engages one of the teeth of the ratchet wheel 224 and due to the spring 237, the pivot or knuckle joint 228 will be moved outwardly so that the stop 238 engages the inner edge of the bell crank lever 227 whereby the knuckle pivot lies slightly outwardly of a line extended between the pivot 229 and the point of engagement between the nose or tip of the pawl 226 with the ratchet wheel 224. Hence, the toggle joint formed by the pawl 226 and the bell crank lever 227 is held in locked position. A pull on the tripping rope, cable or chain r suitably connected to the arm or lever 239 extending upwardly from the shaft 235, oscillates such arm thereby causing the eccentric cam 234 to depress the projection 233 thereby imparting swinging movement to the bell crank 227 inwardly. The pivot or knuckle joint 228 is thus moved inwardly of a line extended between the pivot 229 and the point of engagement between the nose or tip of the pawl 226 with the ratchet wheel 224, breaking the toggle joint and permitting the shaft 222 to be rotated under the influence of the spring 223 to return the doors to closed position. During such rotation of the ratchet wheel 225, the pawl 226 is swung upwardly about its pivot 228, the curved under side thereof riding idly over the ratchet teeth 225. When the doors are again released to move to dumping position under load, the nose or tip of the pawl 226 by engaging one of the teeth 225, is carried around aided by the spring 237 to the position indicated in solid lines in Figure 14. The pawl and ratchet mechanism is now again ready to function as hereinbefore described.

Referring now more particularly to Figures 15 and 16, the dumping movement of the doors 221 is controlled by a pair of pawl mechanisms, designated at 241. Each of the doors 221 is provided with a ratchet rack 242 having a plurality of inclined one-way teeth projecting outwardly therefrom. These racks 242 are preferably mounted on the end edges of the doors adjacent the meeting edges thereof at that end of the vehicle bed carrying a return control ratchet mechanism.

Inasmuch as the ratchet mechanisms 241 are substantially duplicates of each other except that one is right and the other left, only one will be described in detail, reference being had to Figures 15 and 16.

Cooperating with the rack 242, is a pawl 243 pivotally carried in the forked lower end of a bell crank lever 244 upon a pivot pin 245 extending through the legs of the forked end. Bell crank lever 244 is pivotally connected at its intermediate end between a pair of spaced ears of a bracket 246 suitably secured to the end member of the main frame 31' of the vehicle. A suitable pin 247 provides the pivotal connection between the bell crank lever 244 and the bracket 246. Below and slightly inwardly toward the bracket 246, the bell crank lever 244 is provided with a stop portion 248 adapted to engage a cooperating stop 249 extending outwardly from the base of the bracket 246 to limit the inward swinging movement of the lower end of the bell crank lever 244. The outwardly extending end 251 of the bell crank lever 244 is forked and carries thereon and pivotally connected thereto between the legs of the fork upon a pin 252, a lever 253. The lower end of lever 253 has pivotal connection at 254 with the upper forked end of a link 255, the lower forked end of which is pivotally connected with the outer end of the pawl 243 at 256. The upper end of lever 253 is connected at 257 in the forked outer end of a link 258, the inner end of which is also forked and provided with elongated slots 259 providing a lost motion connection through the pin 261 with the lower end of a lever 262 suitably secured to the shaft 235, which controls the release of the spring return ratchet means. A coil spring 263 is suitably anchored at its outer end in a laterally extending lug or projection 264 extending from the lever 253 between the pivots 252 and 254, the inner end of the spring 263 being suitably anchored in a laterally extending lug or projection 265 provided upon the bracket 246.

To limit the inward movement of the pivot or knuckle joint 254, the outer edge of the bell crank lever 244 is provided with a suitable stop projection 266. To limit the swinging movement of the pawl 243 in a releasing direction relative to the bell crank lever 244, a stop 243' on the pawl is adapted to engage a stop 244' on the lever.

As shown in Figure 16, in full lines, the spring 263 urges the pivot or knuckle joint 254 into engagement with stop projection 266, the arrangement being such that in this position of the parts, the pivot or knuckle joint 254 is inwardly of a line connecting the pivot points 252 and 256 whereby the toggle connection formed by the lever 253 and link 255 is held locked, thereby preventing releasing movement of the pawl 243 under the load weight pressure exerted upon the tip or nose of the pawl by the ratchet rack 242.

When it is desired to dump the load, the shaft 235 is rotated by a pull on the rope, cable, or chain r, connected to the upper end of the tripping lever 239 (see Figure 14) causing the lever 262 to rotate in the direction of the arrow x (Figure 16). This rotation of the lever 262 causes the upper end of the lever 253 to be drawn inwardly through the link 258 whereupon the pivot or knuckle joint 254 is moved outwardly to a position beyond the line connecting the pivot points 252 and 256 whereby the toggle connection is broken. The weight of the load now causes the doors 221 to move downwardly to dumping position, the parts assuming the dotted line positions shown in Figure 16. Movement of the ratchet rack 242 downwardly causes the pawl 243 to idly ride over the teeth of the rack and due to the pivotal mounting of the bell crank lever 244, the lower end of the bell crank will freely oscillate until the nose or tip of the pawl 243 has passed beyond the upper end of the rack 242. Tripping of the mechanism may thus be only instantaneous, and upon release of the control rope, chain, or cable r, the spring 263 will immediately urge the parts to the full line positions shown in Figure 16, the inward movement of the bell crank lever 244 being limited by the engagement of the stop 248 with the stop 249.

When the load has been dumped, the doors at this time being retained in open position by the restraining action of the pawls 226 (Figure 14), the vehicle may be moved away from the deposited pile of material. A pull on the control rope, cable, or chain r, now releases the spring return control ratchet mechanisms, and the doors are returned to closed position. As the upper end of the rack 242 engages the rounded underside of the nose or tip of the pawl 243, this pawl is moved outwardly carrying with it the lower end of the bell crank lever 244 since the pivot or knuckle joint 254 is now in locked position. Inasmuch as the bell crank lever 244 is pivoted at 247, the lower end of the bell crank will oscillate idly as the ratchet rack teeth cam the pawl 243 outwardly until the doors have reached their maximum closed positions. In such positions of the doors, the spring 263 will urge the nose or tip of the pawl 243 inwardly to engage one of the teeth of the ratchet rack 242 and the parts now being restored to the position indicated in solid lines in Figure 16, the vehicle is now ready to receive another load. During the oscillating movement of the bell crank lever 244, the shaft 235 will remain in stationary position by virtue of the lost motion connection, namely, the loose connection between pin 261 and slot 259, whereby inward reciprocation of the link 258 will not effect the pin 261.

Among the outstanding features of the modified embodiment just described, are the mounting of the doors for pivotal support from the bed of the vehicle upon shafts which also carry the spring return means, thereby utilizing a single shaft to perform the dual functions of supporting the doors and transmitting return movement to the doors; and the provision of a novel arrangement of ratchet control mechanisms controlling the dumping movement of the doors and the spring return movement of the doors, from a single, common releasing or tripping means. It will be readily apparent that since the release or tripping of the ratchet control mechanisms is practically instantaneous, only a quick jerk or tug upon the remote control rope, cable or chain r by an operator is necessary to effect release of the control mechanisms for operating movement of the doors in either dumping or spring return directions. It is to be further noted that the tripping of the control mechanisms is accomplished by a movement of the tripping means in the same direction.

Referring now to Figures 17 to 21, inclusive, I have illustrated a further embodiment of my invention incorporating the salient features thereof. The exemplary type of the load carrying vehicle illustrated, is practically the same as that disclosed in the aforementioned Benbow and Green patent, comprising a main frame 271, a load carrying bed or hopper 272 supported thereon, the open bottom of the bed being normally closed by a pair of dump doors 273, 273 which have any suitable hinged or pivotal connection with the vehicle, such for example, as by hinge eyes 274 secured to the outer edges of the doors and having swinging and vertically sliding engagement with hinge brackets or bars 275 fixedly secured in spaced relation to the longitudinal side members of the main frame 271.

Referring now to the door operating mechanism for controlling the dumping doors 273, a drum 276 provided with a peripherally grooved cable or chain receiving portion 277 at its inner end and having fixedly secured thereto a ratchet wheel 278 at its outer end, is supported for rotary motion at the rear end of the vehicle bed 272 and in parallel relation thereto upon a shaft 279 extending in parallel relation to the longitudinal axis of the vehicle bed and fixedly mounted at its ends in a bracket (not shown) suitably secured to the rear outer end of the vehicle bed. A suitable bracing means comprising an upright of a rearwardly extending frame 281 suitably secured at its lower end to the rear end frame member of the main frame 271 and at its upper end to the vehicle bed 272 adjacent the upper marginal edge thereof is provided to reinforce the overhanging rear end of the main frame. The inner side of the drum 276 between the cable receiving portion 277 and the ratchet wheel 278, carries a suitable spiral winding spring 282 having one end thereof suitably secured to the stationary shaft 279 and the other end thereof suitably secured to the inner periphery of the drum 276. The spring is so arranged and is of such capacity that the weight of the load acting downwardly on the dumping doors when the latter are tripped creates sufficient tension in the spring to raise the doors to closed position after the weight of the load is removed therefrom. A suitable adjusting means (not shown) may be provided for such spring 282 for adjusting the initial tension of the spring.

Winding upon the cable receiving portion 277 of the drum 276, are two downwardly extending cables 283, extending substantially to the meeting edges of the doors, from which they extend lengthwise of the doors, either through the doors, as shown, or under the same in suitable guides therefor. The forward ends of these flexible members are then connected to an equalizing member (not shown) at the forward end of the bed, such equalizing member being in turn connected to a cable 284 extending rearwardly and passing over a guide sheave 285, thence along the outer side of the bed back to the cable winding portion 277 of the drum 276. It will be evident from the foregoing that rotation of the drum 276 in one direction permits lowering of the doors to dumping position, and rotation of such drum in the opposite direction is operative to raise the doors to closed position.

The dumping of the doors is effected by the tripping of ratchet mechanism, and the spring actuated return of the doors to closed position is likewise effected by the tripping of the same ratchet mechanism. In Figures 19 to 21, inclusive, I have shown in more or less diagrammatic detail, the ratchet mechanism for controlling the movements of the doors. The ratchet teeth 286 of the ratchet wheel 278 are adapted to cooperate with a ratchet pin 287 carried in the forked outer end of a bell-crank lever 287' the intermediate portion of which is pivoted in the forked upper end of a lever 288 upon a pin 289, the lower end of lever 288 being pivoted to the outer side of the web of the end main frame member at 291. The upper flange 292 of the end main frame member is cut away at 293 to form limiting stops 294 and 295, the intermediate portion of the lever 288 passing through such cut away portion, the stops 294 and 295 defining the limits of oscillation of the lever 288. Bell crank lever 287' has one leg 296 thereof extending outwardly and downwardly, in the end of which one end of a coil spring 297 is anchored, the other end of said spring being suitably anchored to the pin 291. A horizontally disposed link 298 has the inner forked end thereof pivotally connected to the pin 289, the outer end of this link having pivotal connection at 299 with a lever 301 fixedly secured to a shaft 302 journaled at its rear end in a suitable bearing bracket 303. This shaft is supported along the upper side of one of the longitudinally extending main frame side members and extends from the rear end of the bed to a point slightly beyond the front end of said bed. At the front end of the bed, a bracket 304 has its base secured in any suitable or desired manner to the upper flange of the front end transverse main frame member. The front end of shaft 302 is journaled in a bearing portion 305 provided adjacent one end of bracket 304, such end of the shaft 302 extending forwardly beyond the bearing portion 305 and carrying on this extended portion a lever 306 suitably fixedly secured to the shaft. The upper end of the lever 306 has pivotal connection at 307 with a link 308 which in turn has pivotal connection at 309 with a second link 311. This latter link is pivotally connected to an upstanding ear 312 at the inner end of bracket 304 on pin 313.

A tripping lever 314 of substantially L-shaped configuration is pivotally supported at the junction of the two legs thereof upon a supporting portion 315 seated upon the base of the bracket 304 and extending rearwardly to a point slightly beyond the pivotal connection 309. The horizontally disposed leg portion of the tripping lever 314 is adapted in inoperative position to rest upon the supporting portion 315 with the rear end of such leg extending slightly beyond the pivotal connection 309. Link 311 is provided with a depending lug 316 below the pivotal connection 309 and this lug is adapted in the position shown in Figure 19 to abut the upper surface of the horizontally extending leg of the lever 314, lug 316 thereby functioning as a stop to limit the downward movement of the pivotal connection 309. The upper end of lever 314 is provided with a suitable perforation 317 adapted to receive one end of a rope, cable or chain r extending forwardly from the vehicle bed for purposes of remote control of the tripping mechanism just described.

In the position of parts shown in Figure 19, the ratchet wheel 278 is retained against rotation thereby preventing rotation of the drum 276 and restraining dumping movement of the doors 273. It is to be noted that in this position of the parts, the pivotal connection 309 is disposed at a point slightly below a line connecting the pivot points 307 and 313 due to the action of gravity, and the toggle formed by the links 308 and 311 through the pivotal connection or joint 309 is in locked position being limited against further downward movement by the engagement of the lug 316 with the horizontally disposed leg of the lever 314, which in turn abuts the upper side of the projection 315. Thus any tendency on the part of the ratchet wheel 278 to rotate in the direction of the arrow Y, indicating the direction of rotation of such ratchet wheel when the doors move to dumping position, is counteracted by the ratchet pin 287 since the shaft 302 is prevented from rotating to accommodate swinging movement of the lever 288 to the right as viewed in Figure 19. A pull on the control rope, chain, or cable r, swings the lever 314 forwardly about its pivot elevating the other leg of such lever and moving the pivotal connection 309 to a point above a line connecting the pivotal connections 307 and 313. The weight of the load now acting upon the doors and through the cables 283 tending to impart rotational movement in the direction of the arrow Y, will now be free to act, and upon rotation of the drum in such direction the pivotal joint 289 will be moved to the right as viewed in Figure 19 causing continued rotation of the shaft 302 in the direction of rotation imparted to it upon the breaking of the toggle connection between links 308 and 311. Thus the ratchet pin 287 and its associated lever 287' will be carried around in a counterclockwise direction about the pivot point 289 to a point below the pivot point 289 and as the ratchet wheel 278 continues to rotate in dumping direction, the ratchet pin 287 will idly oscillate over the teeth 286 of the wheel 278 under the influence of the spring 297. The starting movement of such ratchet pin 287 and corresponding movements of the other parts forming the control mechanism are clearly shown in Figure 20. As the pin 287 idly oscillates over the teeth 286 of the wheel 278, the toggle joint or pivotal connection 309 is permitted to resume its down or locked position since during this portion of the operation of the doors the control mechanism is unrestrained. After the conclusion of the dumping operation, the doors now being relieved of the weight of the load, the spring return mechanism is free to operate but is promptly restrained from returning the doors to closed position by the ratchet mechanism as clearly shown in Figure 21, at which time a pull to the right upon the link 298 will tend to impart rotational movement to the lever 306 through the shaft 302 to the right or clockwise and since the joint 309 is at this time in locked condition, the return rotation of the drum 278 will be restrained in the return rotation direction indicated by the arrow Z (Figure 21). After the vehicle has been moved away from the pile of deposited material, the lever 314 may again be tripped by a pull upon the control rope, cable, or chain r, and upon breaking of the toggle joint or connection 309, the drum 278 will be free to rotate in the direction of the arrow Z thereby returning the doors to closed position. As the wheel 278 rotates in such direction in the course of the returning movement of the doors to closed position, the pin 287 and its associated lever 287' are now carried around in a clockwise direction as viewed in Figure 21 whereupon the ratchet pin 287 is brought up from a point below the pivot 289 to a point above such pivot and as the wheel 278 continues to rotate in door return direction, the pin 287 idles over the ratchet teeth 286 under the influence of the spring 297. At the completion of the door closing operation, when another load is deposited upon the doors, the tendency on the part of the weight of such load acting upon the doors and transmitting rotational effort in the direction of the arrow Y to the drum 278, will cause the parts to again become effective to restrain such rotation of the drum 276, and the operating and control parts are now again ready to move through the cycle of operation just described.

It will be noted that among the outstanding features of the embodiment disclosed in Figures 17 to 21, inclusive, are the compactness of the door spring return mechanism; the simplicity of arrangement and operation of the control ratchet mechanism for such door return mechanism and for restraining movement of the doors to dumping position; and tripping of the ratchet mechanism is accomplished to release the door control or operating mechanism for rotation of the drum in either direction by a simple movement of the tripping lever in one direction.

It will be readily apparent that a pair of ratchet mechanisms each controlling directional movement of the drum 276 in one direction only may be employed by positioning such ratchet mechanisms one on either side of the ratchet wheel 278. It will be further apparent that the ratchet mechanism hereinbefore described in connection with the modifications disclosed in Figures 1 and 2 and illustrated in Figures 3 to 9, inclusive, may be employed in place of the single mechanism shown and described in connection with the modified operating means shown in Figures 17 and 18, particularly if such operating mechanism is mounted at the forward end of the vehicle bed in place of at the rear end thereof as shown. The modified form of single transposable ratchet mechanism disclosed in Figures 10 and 11, may also be readily adapted to the operating mechanism disclosed in Figures 17 and 18 where such mechanism is mounted for operation at the front end of the vehicle bed.

If it is desired to employ the mechanism disclosed in Figures 17 and 18 for a four door vehicle construction, it will be readily apparent that additional cables may be extended from the cable winding portion 277 to the additional pair of doors in a manner substantially like that shown diagrammatically in Figure 2.

Referring now more particularly to Figures 22 to 24, inclusive, I have illustrated a further modified form of ratchet mechanism particularly adapted for controlling a spring wind-up mechanism of the character disclosed in Figures 1 and 2. As in the case of the modifications disclosed in Figures 3 to 5, inclusive, a pair of ratchet wheels 331 and 332 is mounted in spaced relation on the shaft 38 and retained for rotation therewith by keys 333 and 334. Ratchet wheel 331 is designed to control the spring return rotational movement of the shaft 38 and is provided with peripheral inclined one-way teeth 335. The teeth 335 are adapted to cooperate with a ratchet pawl 336 having a nose or tip 337, such pawl being suitably supported for pivotal movement in the plane of the ratchet wheel 331 and immediately thereabove, in the forked lower end of a link 338 upon a pin 339 passing therethrough, the intermediate portion of pawl 336 being reduced in transverse dimension for accommodation in such forked end. Pin 339 is suitably retained from accidental displacement by means of suitable cotter pins 341 extending therethrough adjacent the ends thereof. At its upper end, the forked link 338 is provided with a hub portion 342 either formed integrally with the link 338 or suitably welded thereto and serving to maintain the spaced relationship of the sides of the link 338. The upper end of link 338 is pivotally supported upon a horizontally extending pin or axle 343 supported intermediate its ends in a forwardly extending portion 344 of a bracket 345 having base or supporting flanges 346 which may be suitably secured to the forward side of the front end of a vehicle bed. Pin or axle 343 is removably secured in the portion 344 by means of a suitable set screw 347.

Pawl 336 extends upwardly above the pivot pin 339 and is provided at its upper end with a sufficiently wide stop portion 348 adjusted to straddle the edges of the link 338 to limit the rotational movement of the pawl 336 about its pivot 339 in a clockwise direction as viewed in Figure 23.

Adjacent its lower end, the portion 344 of bracket 345 is provided with a cut-out portion or pocket 349 for receiving in horizontal disposition, a releasing or tripping lever 351 which is pivotally connected to the portion 344 by means of a pin 352, the forward edge of the shorter arm of lever 351 being adapted to engage the rear edge of link 338.

It will be readily apparent from Figure 23, that in the operative position of the pawl 336 to prevent rotation of the shaft 38 in spring return direction indicated by the arrow A, the pin 339 lies rearwardly of a line connecting the effective contact point between the nose or tip 337 of the pawl 336 and the upper end pivot 343 of link 338. Inasmuch as stop 348 prevents rearward or clockwise rotation of the pawl 336 about its pivot, an effective locked toggle connection results whereby rotation of the shaft 38 in spring return direction is prevented.

Upon movement of the lever 351 to the left, as viewed in Figure 22, the outer end of this lever will move forwardly, thereby being effective to break the locked condition of the toggle connection and permitting spring return rotation of the shaft 38 with its associated ratchet wheel 331. Upon such rotation of the ratchet wheel 331, the nose or tip 337 of the pawl 336 will be carried around about its pivot 339, such nose or tip riding idly over the outer edges of the teeth 335.

Ratchet wheel 332 is similarly provided with inclined one-way teeth 353, the inclination of these teeth being opposed to that of the teeth 335 of ratchet wheel 331. Similarly, the pawl 354 having a nose or tip 355 adapted to engage the ratchet teeth 353, is pivotally supported in the forked lower end of a link 356, of similar structural features to link 338, the upper end of link 356 being pivotally supported upon the pin 343 on the opposite side of the portion 344 of bracket 345. The upper end of pawl 354 is similarly provided with a stop portion 357 adapted to engage the rear edge of link 356 to thereby limit counterclockwise rotation of the pawl 354 about its pivot 358, as viewed in Figure 23. The two pawls 336 and 354 are each provided with tension springs 361 and 362 which are connected at their lower ends to apertured lugs on the pawls and which extend upwardly between the spaced side portions of the respective links 338 and 356 and are connected at their upper ends to apertured lugs projecting from the upper hub portions of the links. These springs tend to swing the pawls in a direction to normally hold the pawl stop portions 346 and 357 pressed against the outer sides of their respective supporting links, and aid in restoring the pawls after being tripped.

In the operative position of the pawl 354, it will be noted that the pivot 358 is disposed forwardly of a line connecting the effective point between the nose or tip 355 of pawl 354 with the axial center of pivot pin 343, thereby forming a locked toggle joint or connection and restraining dumping rotation of the shaft 38 in the direction of the arrow B. The forward edge of link 356 is adapted to be engaged by the rear edge of the shorter end of lever 351 whereby the movement of the lever 351 to the left, as viewed in Figure 22, will cause breaking of the toggle connection between pawl 354 and link 356 whereby the ratchet wheel 332 will be freed for rotation in the direction of the arrow B, thus permitting dumping rotation of the shaft 38. As in the case of the pawl 336, when the ratchet wheel 332 rotates in the direction of the arrow B, pawl 354 will be swung about its pivot 358 whereupon the nose or tip 355 will be carried around and caused to ride idly over the outer edges of the teeth 353.

During such idling of the pawl 354 in the course of the dumping operation, pawl 336 will be returned to its effective position, as shown in Figure 23, by the engagement of the nose or tip 337 with one of the teeth 335 and upon restoration of the pawl to such position and continuation of rotation of the shaft 38 in the direction of the arrow B, pawl 336 will idly oscillate over the teeth 335 of its cooperating ratchet wheel 331.

It will be of course readily apparent that upon tripping of the pawl 336, during rotational movement of the shaft 38 in the direction of the arrow A, the nose or tip 355 of the pawl 354 will be carried around in like manner by its cooperating ratchet wheel 332 and restored to effective position.

Thus, it will be readily apparent that upon swinging movement of the lever 351 in the same direction, the shaft 38 may be released for operation in either dumping or spring return movements thereof.

The extreme end of the longer portion of lever 351 is provided with a suitable hole or perforation 359 for the reception of a suitable remote control rope, cable or chain r whereby the ratchet mechanisms may be readily tripped by an operator positioned remotely from the operating mechanism.

It will be of course readily understood that the ratchet mechanism just described may be readily employed in the manner disclosed in Figure 1 and may be, if so desired, suitably applied to the door operating mechanism disclosed in the modification illustrated in Figures 12 and 13.

Several of the above described embodiments can be readily attached to wagons having manually operated wind-up mechanisms, such as in the Benbow and Green Patent No. 1,706,099, without requiring any extensive alteration or modification of the structure. Hence these structures have utility as attachments or accessories for the older wagons in addition to their utility as built-in constructions. For example, the constructions shown in Figures 3 to 11 and 22 to 24 can be adapted to the older types of wagons by merely removing the hand operated wind-up and ratchet mechanisms from the shaft 38 and substituting the present return spring and ratchet mechanisms on this shaft. Moreover, the drum type having the spiral spring illustrated in Figures 17 to 21 can also be easily adapted to the older vehicles without necessitating extensive changes in the construction thereof.

While I have disclosed several preferred embodiments of my invention, I do not wish to be limited thereto. As will be well understood by those skilled in the art certain changes may be made therein without departing from the essence of the invention or the spirit and scope of the appended claims.

What I claim and desire to secure by Letters Patent is:

1. In a load carrying vehicle, the combination with a bed and dumping door means closing the bottom of said bed, of a rotatable member operatively connected with said door means and rotating in one direction when said door means is dumped and rotating in the opposite direction when said door means is restored to closed position, spring means operatively connected with said door means whereby the movement of said door means to open position under the pressure of the load stores energy in said spring means which is subsequently utilized in returning said door means to closed position, ratchet means transposable to different positions to hold said rotatable member against rotation in either direction, and controlling means having a normal position and effective by movement in one direction from said normal position to trip said door means for dumping and effective by movement in the same direction from said normal position to allow said door means to return to closed position under the action of said spring means.

2. In a dump wagon adapted to be drawn by a tractor and including a bed having a dumping opening therein, the combination with a dump door for closing said opening, of controlling mechanism for said door comprising a rotatable winding member, a flexible winding element operatively connected with said door and adapted to wind upon and unwind from said winding member in the closing and opening movements of said door, spring means operatively connected with said rotatable winding member whereby the movement of said door to open position under the pressure of the load stores energy in said spring means which is subsequently utilized to return said door to closed position, locking mechanism comprising a ratchet movable with the door and a pawl means operable to restrain movement of the ratchet in both directions for door for closing said opening, of controlling mechanism for said door comprising spring means, means establishing an operative connection between said door and said spring means whereby the movement of said door to open position under the pressure of the load stores energy in said spring means which is subsequently utilized to return said door to closed position, locking mechanism comprising transposable ratchet means for holding said door closed against the pressure of the load and for holding said door open against the pressure of said spring means, a remote control tripping rope extending to the operator's position on the tractor, and means operatively connecting said tripping rope with said locking mechanism whereby a pull on said rope is operative to release said transposable ratchet means to allow said door to open, and a pull on said rope is operative to release said transposable ratchet means to allow said door to close.

9. In a dump wagon adapted to be drawn by a tractor and including a bed having a dumping opening therein, the combination with a dump door for closing said opening, of controlling mechanism for said door comprising spring means, means establishing an operative connection between said door and said spring means whereby the movement of said door to open position under the pressure of the load stores energy in said spring means which is subsequently utilized to return said door to closed position, locking mechanism comprising a single ratchet wheel and a single locking pawl serving to both hold said door closed against the pressure of the load and to hold said door open against the pressure of said spring means, and a single remote control tripping rope extending to the operator's position on the tractor and operatively connected with said locking mechanism whereby a pull on said rope is operative to release said single locking pawl to allow said door to open and a pull on said rope is operative to release said single locking pawl to allow said door to close.

10. In a dump wagon adapted to be drawn by a tractor and including a bed having a dumping opening therein, the combination with a dump door for closing said opening, of controlling mechanism for said door comprising spring means, means establishing an operative connection between said door and said spring means whereby the movement of said door to open position under the pressure of the load stores energy in said spring means which is subsequently utilized to return said door to closed position, locking mechanism for holding said door closed against the pressure of the load and for holding said door open against the pressure of said spring means, said locking mechanism comprising a toothed rotatable wheel, a reversible pawl operative to act in one direction against the teeth of said wheel to hold said door closed and operative to act in the reverse direction against the teeth of said wheel to hold said door open, a remote control tripping rope extending to the operator's position on the tractor, and means operatively connecting said tripping rope with said reversible pawl whereby a pull on said rope is operative to release said locking mechanism to allow said door to open, and a pull on said rope is operative to release said locking mechanism to allow said door to close.

11. In a load carrying vehicle, the combination with a bed and dumping door means closing the bottom of said bed, of a rotatable member associated with said door means and rotating in one direction when said door means is dumped and rotating in the opposite direction when said door means is restored to closed position, ratchet means transposable to different positions to restrain said rotatable member from rotation in either direction, and trip means having a normal position and movable alternately in the same direction from said normal position to effect the operative condition of said ratchet means to the transposed positions thereof.

12. In a dump wagon adapted to be drawn by a tractor and including a bed having a dumping opening therein, the combination with a dump door for closing said opening, of controlling mechanism for said door comprising spring means, means establishing an operative connection between said door and said spring means whereby the movement of said door to open position under the pressure of the load stores energy in said spring means which is subsequently utilized to return said door to closed position, locking mechanism for holding said door closed against the pressure of the load and for holding said door open against the pressure of said spring means, said locking mechanism comprising a toothed member, a pawl coacting with said toothed member, and toggle means for releasably holding said pawl in locking engagement with said toothed member, and a remote control tripping rope extending to the operator's position on the tractor and operatively connected with said locking mechanism whereby a pull on said rope is operative to release said locking mechanism to allow said door to open and a pull on said rope is operative to release said locking mechanism to allow said door to close.

13. In a dump wagon adapted to be drawn by a tractor and including a bed having a dumping opening therein, the combination with a dump door for closing said opening, of controlling mechanism for said door comprising spring means, means establishing an operative connection between said door and said spring means whereby the movement of said door to open position under the pressure of the load stores energy in said spring means which is subsequently utilized to return said door to closed position, locking mechanism for holding said door closed against the pressure of the load and for holding said door open against the pressure of said spring means, said locking mechanism comprising a toothed member, a pawl coacting with said toothed member, and toggle means for releasably holding said pawl in locking engagement with said toothed member, a remote control tripping rope extending to the operator's position on the tractor and operatively connected with said locking mechanism whereby a pull on said rope is operative to release said locking mechanism to allow said door to open and a pull on said rope is operative to release said locking mechanism to allow said door to close, and means for automatically restoring said toggle means to locked relation.

14. In a dump wagon adapted to be drawn by a tractor and including a bed having a dumping opening therein, the combination with a dump door for closing said opening, of controlling mechanism for said door comprising spring means, means establishing an operative connection between said door and said spring means whereby the movement of said door to open position under the pressure of the load stores energy in said spring means which is subsequently utilized to return said door to closed position, locking mechanism for holding said door closed against the pressure of the load and for holding said door open against the pressure of said spring means, said locking mechanism comprising a ratchet wheel, a pawl coacting with said ratchet wheel, self-restoring toggle parts for releasably holding said pawl in locking engagement with said ratchet wheel, and trip means operatively connected with said toggle parts and movable alternately in the same direction to release said locking mechanism to allow said door to open and to allow said door to close.

15. A load carrying vehicle comprising a bed, a dumping door pivotally supported longitudinally of said bed to close the bottom of said bed, mechanism for closing said door comprising a rotatable member extending longitudinally of said bed, arms carried by said member and arranged normally to support said door but to permit movement of the door away therefrom, releasable means for restraining return rotation of said member, and releasable means adapted to engage said door to retain it in closed position.

16. A load carrying vehicle comprising a bed, a dumping door pivotally supported longitudinally of said bed to close the bottom of said bed, mechanism for closing said door comprising a rotatable member extending longitudinally of said bed and rotatable on an axis in close proximity to the pivot axis of said door, arms carried by said member and arranged normally to support said door but to permit movement of the door away therefrom, energy storing means carried by said member and responsive to dumping movement of said door under load and adapted to normally urge said door to closed position, releasable means associated with said member to render said energy storing means ineffective, and releasable means adapted to retain said door in closed position.

17. A load carrying vehicle comprising a bed, a dumping door closing the bottom of said bed, a shaft journaled along one longitudinal edge of said bed and operatively associated with said door to transmit closing movement thereto, spring means mounted on and connected with said shaft and adapted to be tensioned by dumping movement of said door under load and upon tensioning and release of the load, being adapted to normally urge said shaft to rotate in door closing direction, a releasable ratchet mechanism adapted to restrain door closing rotation of said shaft, and releasable means adapted to engage and retain said door in closed position comprising a toothed ratchet plate secured to one end of said door, and a pivoted pawl mounted to effect automatic latching engagement with said ratchet plate when said door swings to closed position.

18. A load carrying vehicle, comprising a bed, a dumping door closing the bottom of said bed, a shaft journaled along one longitudinal edge of said bed and pivotally supporting said door, said shaft having one end thereof extending beyond one end of said bed, means carried by said extending end of said shaft and adapted to be tensioned by dumping movement of said door under load and upon tensioning and release of the load, being adapted to normally urge said shaft to rotate in door closing direction, a releasable ratchet mechanism adapted to restrain door closing rotation of said shaft, releasable ratchet means adapted to engage and retain said door in closed position, and a common operating means effecting release of both of said releasable ratchet means in successive movements of said door to dumping and closing positions.

19. A load carrying vehicle comprising a bed, a dumping door closing the bottom of said bed, a shaft journaled along one longitudinal edge of said bed and pivotally supporting said door, said shaft having one end thereof extending beyond one end of said bed, means carried by said extending end of said shaft and adapted to be tensioned by dumping movement of said door under load and upon tensioning and release of the load, being adapted to normally urge said shaft to rotate in door closing direction, a releasable ratchet mechanism adapted to restrain door closing rotation of said shaft, releasable ratchet means adapted to engage and retain said door in closed position, and a common operating means operable in one direction to effect release of both of said releasable ratchet means in successive movements of said door to dumping and closing positions.

20. A load carrying vehicle comprising a bed, a dumping door closing the bottom of said bed, door raising mechanism comprising a single drum mounted upon one of the ends of said bed, flexible means wound on said drum and extending to said door, energy storing means enclosed within said drum and responsive to dumping movement of said door under load, and ratchet means transposable to different positions to hold said drum against rotation in either direction.

21. A load carrying vehicle comprising a bed, a dumping door closing the bottom of said bed, door raising mechanism comprising a single drum mounted upon one of the ends of said bed, flexible means wound on said drum and extending to said door, energy storing means enclosed within said drum and responsive to dumping movement of said door under load, a rotatable toothed member rotating with said drum in one direction when said door is dumped and rotating in the opposite direction when said door is restored to closed position, and two-way ratchet means cooperating with said member to control the rotation thereof in either direction.

22. A load carrying vehicle comprising a bed, a dumping door closing the bottom of said bed, door raising mechanism comprising a single drum mounted upon one of the ends of said bed, flexible means wound on said drum and extending to said door, energy storing means enclosed within said drum and responsive to dumping movement of said door under load, a rotatable toothed member rotating with said drum in one direction when said door is dumped, and rotating in the opposite direction when said door is restored to closed position, two-way ratchet means cooperating with said member to control the rotation thereof in either direction, and trip means operable in one direction to transpose the ratchet means to the alternative effective positions thereof.

23. A load carrying vehicle comprising a bed, a dumping door closing the bottom of said bed, door raising mechanism comprising a single drum mounted upon one of the ends of said bed, flexible means wound on said drum and extending to said door, energy storing means enclosed within said drum and responsive to dumping movement of said door under load, a rotatable toothed member rotating with said drum in one direction when said door is dumped and rotating in the opposite direction when said door is restored to closed position, two-way ratchet means cooperating with said member to control the rotation thereof in either direction, and trip means at the other end of said bed effective by operation in one direction to transpose the ratchet means to the alternative effective positions thereof.

24. In a dump wagon adapted to be drawn by a tractor and including a bed having a dumping opening therein, the combination with a dump door for closing said opening, of controlling mechanism for said door comprising spring means, means establishing an operative connection between said door and said spring means whereby the movement of said door to open position under the pressure of the load stores energy in said spring means which is subsequently utilized to return said door to closed position, locking mechanism comprising a first ratchet wheel and a first pawl for holding said door closed against the pressure of the load and comprising a second ratchet wheel and a second pawl for holding said door open against the pressure of said spring means, a remote control tripping rope extending to the operator's position on the tractor and operatively connected with one of said pawls, and means establishing an operative connection between said pawls whereby each may be released by a pull upon said rope.

25. In a dump wagon adapted to be drawn by a tractor and including a bed having a dumping opening therein, the combination with a dump door for closing said opening, of controlling mechanism for said door comprising spring means, means establishing an operative connection between said door and said spring means whereby the movement of said door to open position under the pressure of the load stores energy in said spring means which is subsequently utilized to return said door to closed position, locking mechanism comprising a first ratchet wheel and a first pawl for holding said door closed against the pressure of the load and comprising a second ratchet wheel and a second pawl for holding said door open against the pressure of said spring means, a remote control tripping rope extending to the operator's position on the tractor and operatively connected with said first pawl whereby a pull on said rope is operative to release said first pawl, and cooperating parts, including a lost motion connection, for establishing an operative connection between said pawls, whereby a pull on said rope is operative to release said second pawl.

26. In a dump wagon adapted to be drawn by a tractor and including a bed having a dumping opening therein, the combination with a dump door for closing said opening, of controlling mechanism for said door comprising spring means, means establishing an operative connection between said door and said spring means whereby the movement of said door to open position under the pressure of the load stores energy in said spring means which is subsequently utilized to return said door to closed position, locking mechanism for holding said door closed against the pressure of the load and for holding said door open against the pressure of said spring means, said locking mechanism comprising a toothed rotatable wheel, a dog coacting with said wheel, a pivot support on which said dog is pivotally mounted, said pivot support being movable to enable the pivotal axis of said dog to move relatively to said wheel, remote control tripping rope means extending to the operator's position on the tractor, and means operatively connecting said rope means with said pivot support whereby a pull on said rope means is operative to release said locking mechanism to allow said door to open, and a pull on said rope means is operative to release said locking mechanism to allow said door to close.

27. A load carrying container comprising a dump door for dumping a load from the container, spring means for returning the door to closed position after the dumping of the load, locking mechanism for holding said door closed and for holding said door open, and tripping means for releasing said locking mechanism, said locking mechanism allowing said door to continue its full motion to one of said positions and to become automatically locked in that position notwithstanding the restoration of said tripping means to its normal position prior to the completion of the aforesaid movement of the door.

28. In a load carrying container, the combination with a container body and a dumping door closing the bottom of said body, of a rotatable member associated with said door and rotating in one direction when said door is dumped and rotating in the opposite direction when said door is restored to closed position, a two way ratchet and single pawl mechanism, and a single trip means to control said single pawl and ratchet mechanism for locking the dumping door in an open or closed position.

29. In a load carrying container, the combination with a body and a dumping door closing the bottom of said body, of a rotatable member associated with said door and arranged to rotate in one direction when said door is opened and to rotate in the opposite direction when said door is restored to closed position, spring means associated with said door and arranged to permit the door to open by the weight of the load carried in said body, said spring means capable of exerting sufficient force to completely close said door after the body is emptied, a ratchet movable with said rotatable member and having teeth capable of preventing rotation of said ratchet member in either direction, a single pawl mechanism movable into and out of engagement with said ratchet, and a single trip means operatively connected with said pawl for preventing rotation of said rotatable member in either direction and operative, when released, to provide for the load moving said door to open position and the spring means moving said door to its closed position.

30. In a load carrying container, the combination of a body, dumping door means closing the bottom of said body, spring means arranged to close said door means and arranged to permit the doors to open by the weight of the load carried in said body, said spring means being capable of exerting sufficient force to completely close said doors after the body is emptied, ratchet means movable with said door means in both directions, pawl mechanism including sections associated with said ratchet means, one being operative in one position to prevent movement of the ratchet means in one direction and the other being operative in one position to prevent movement of the ratchet means in the other direction and each operative when momentarily actuated to release the ratchet means for continued movement, movable means shiftable in the same direction for releasing either of said pawl sections and providing for continued movement of said ratchet means after the pawl sections have been restored to their original position, and a remote control member connected to operate said movable means.

31. A load carrying container comprising a dump door for dumping a load from the container, spring means for returning the door to closed position after the dumping of the load, locking mechanism for holding said door closed and for holding said door open, and tripping means for releasing said locking mechanism comprising a rockable shaft, means carried by the shaft and operable by movement of the shaft in one direction for releasing said locking mechanism to provide both for closing the door and for opening the door, a remote control cable, and means connecting said cable and shaft whereby a pull on said cable rocks said shaft in said one direction.

DE MAR A. PALMER.